(12) United States Patent  
Naillon

(10) Patent No.: US 7,849,036 B2
(45) Date of Patent: Dec. 7, 2010

(54) METHOD FOR MONITORING A DECISION-MAKING PROCESS WHEN PURSUING AN OBJECTIVE IN ECONOMIC, TECHNICAL, AND ORGANIZATIONAL FIELDS

(76) Inventor: Martine Naillon, 12 Avenue de Verdun, Sceaux (FR) 92330

( * ) Notice: Subject to any disclaimer, the term of this patent is extended or adjusted under 35 U.S.C. 154(b) by 510 days.

(21) Appl. No.: 11/861,563

(22) Filed: Sep. 26, 2007

(65) Prior Publication Data

US 2008/0215521 A1 Sep. 4, 2008

Related U.S. Application Data

(63) Continuation of application No. 10/399,195, filed as application No. PCT/FR01/03217 on Oct. 17, 2001, now abandoned.

(30) Foreign Application Priority Data

Oct. 17, 2000 (EP) .................................. 00402875

(51) Int. Cl.
*G06N 5/00* (2006.01)
(52) U.S. Cl. .............................. 706/45; 706/10; 706/62
(58) Field of Classification Search .................... 706/10, 706/45, 62; 709/202; 714/25, 26, 37, 100
See application file for complete search history.

(56) References Cited

U.S. PATENT DOCUMENTS 5,241,671 A 8/1993 Reed et al.
5,265,065 A 11/1993 Turtle
5,283,856 A 2/1994 Gross et al.
5,408,619 A 4/1995 Oran
5,448,722 A 9/1995 Lynne et al.
5,561,769 A 10/1996 Kumar et al.
5,628,011 A 5/1997 Ahamed et al.

(Continued)

FOREIGN PATENT DOCUMENTS

EP 1 199 678 A1 4/2002

OTHER PUBLICATIONS

Mac Intosh et al., "Distributed Automated Reasoning: Issues in Coordination, Cooperation, and Performance", IEEE Transactions on Systems, Man and Cybernetics, 21(6), Nov. 1991, pp. 1307-1316.

(Continued)

*Primary Examiner*—Donald Sparks
*Assistant Examiner*—Omar F Fernandez Rivas
(74) *Attorney, Agent, or Firm*—Leydig, Voit & Mayer, Ltd.

(57) ABSTRACT

A method for controlling a decisional process when pursuing an aim in a specific application domain, such as economic, technical, and organizational fields. In the process, a system of agents is created, including creator cognitive agents of portable knowledge objects and constructor agents of knowledge objects by adding supplementary knowledge elements to the knowledge objects created. The system launches the decisional process by tracking the observation of an abnormality in the actual data of the application domain by the creation of an initial knowledge object representative of an alarm index and causes several decisional paths to be established linked to this object, under different points of view of different agents, each in its domain, and the decision is made following merging of decisional paths.

15 Claims, 12 Drawing Sheets

U.S. PATENT DOCUMENTS

| | | | |
|---|---|---|---|
| 5,651,006 A | 7/1997 | Fujino et al. | |
| 5,694,555 A | 12/1997 | Morriss et al. | |
| 5,787,409 A | 7/1998 | Seiffert et al. | |
| 5,893,083 A | 4/1999 | Eshghi et al. | |
| 5,963,447 A | 10/1999 | Kohn et al. | |
| 6,012,152 A * | 1/2000 | Douik et al. | 714/26 |
| 6,035,331 A * | 3/2000 | Soga et al. | 709/223 |
| 6,088,659 A | 7/2000 | Kelley et al. | |
| 6,088,689 A | 7/2000 | Kohn et al. | |
| 6,134,580 A | 10/2000 | Tahara et al. | |
| 6,144,954 A | 11/2000 | Li | |
| 6,182,055 B1 | 1/2001 | Kase et al. | |
| 6,192,402 B1 | 2/2001 | Iwase | |
| 6,289,394 B1 | 9/2001 | Kozuka | |
| 6,314,555 B1 | 11/2001 | Ndumu et al. | |
| 6,341,960 B1 | 1/2002 | Frasson et al. | |
| 6,349,325 B1 * | 2/2002 | Newcombe et al. | 709/202 |
| 6,442,438 B1 | 8/2002 | Naillon | |
| 6,557,025 B1 | 4/2003 | Hattori et al. | |
| 6,594,684 B1 * | 7/2003 | Hodjat et al. | 709/202 |
| 6,665,262 B1 * | 12/2003 | Lindskog et al. | 370/216 |
| 6,754,691 B1 | 6/2004 | Gomi et al. | |
| 2002/0064149 A1 | 5/2002 | Elliott et al. | |

OTHER PUBLICATIONS

Stephen T. C. Wong, "Preference-Based Decision Making for Cooperative Knowledge-Based Systems", ACM Transactions on Information Systems, 12(4), Oct. 1994, pp. 407-435.

Adler et al., "A Development Framework for Distributed Artificial Intelligence", Proceedings on the Fifth Conference on Artificial Intelligence Applications, IEEE Computer Society, Mar. 1989, 5 pages.

* cited by examiner

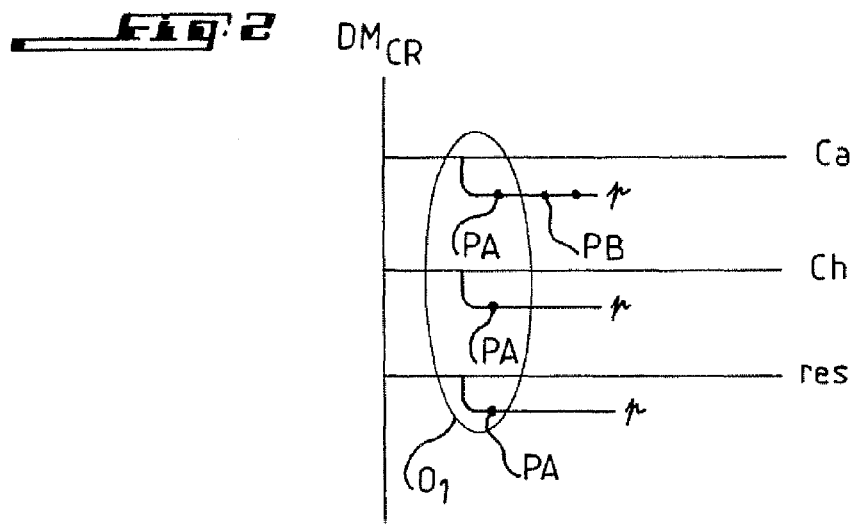
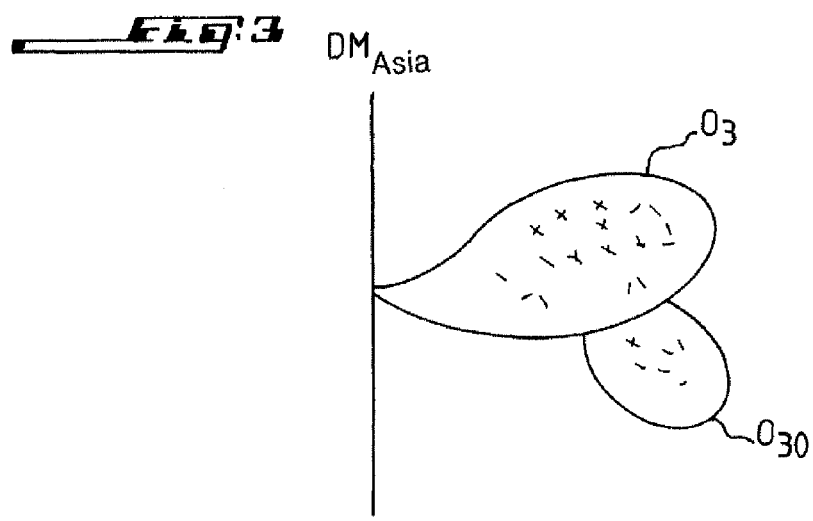
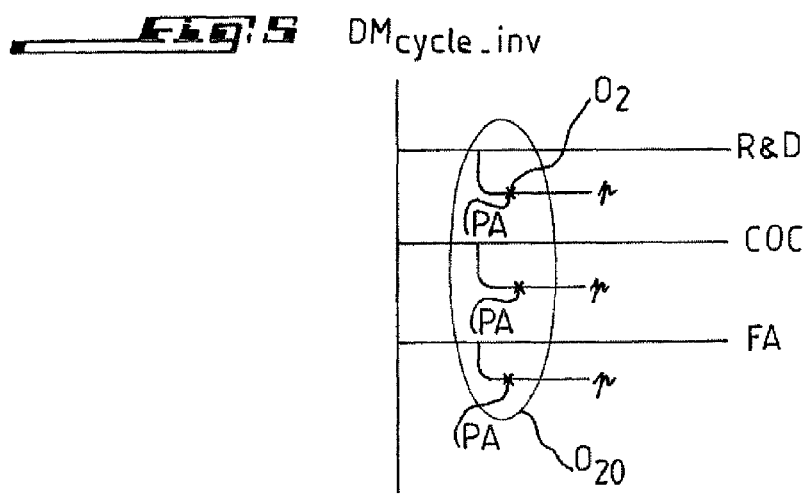

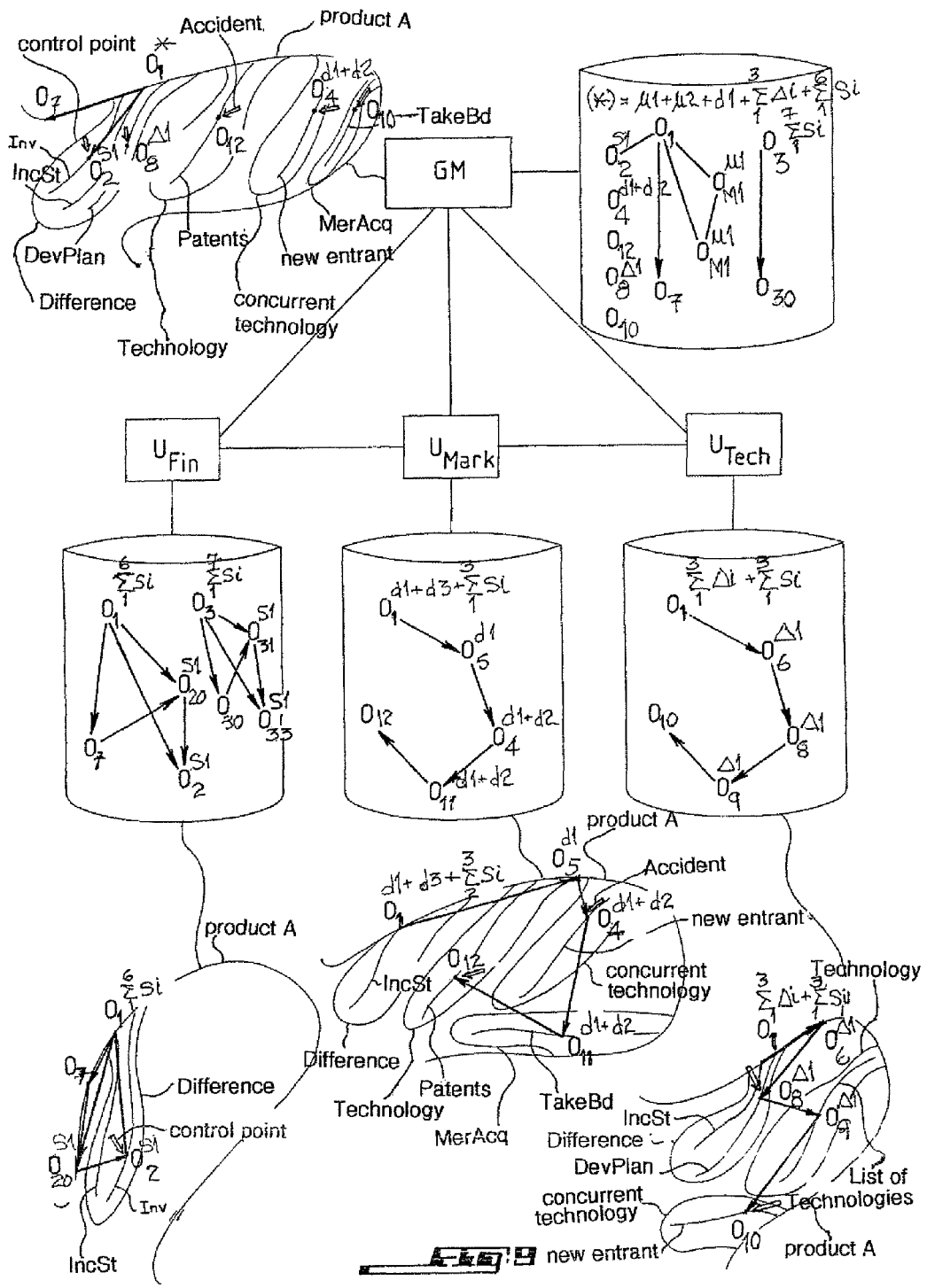

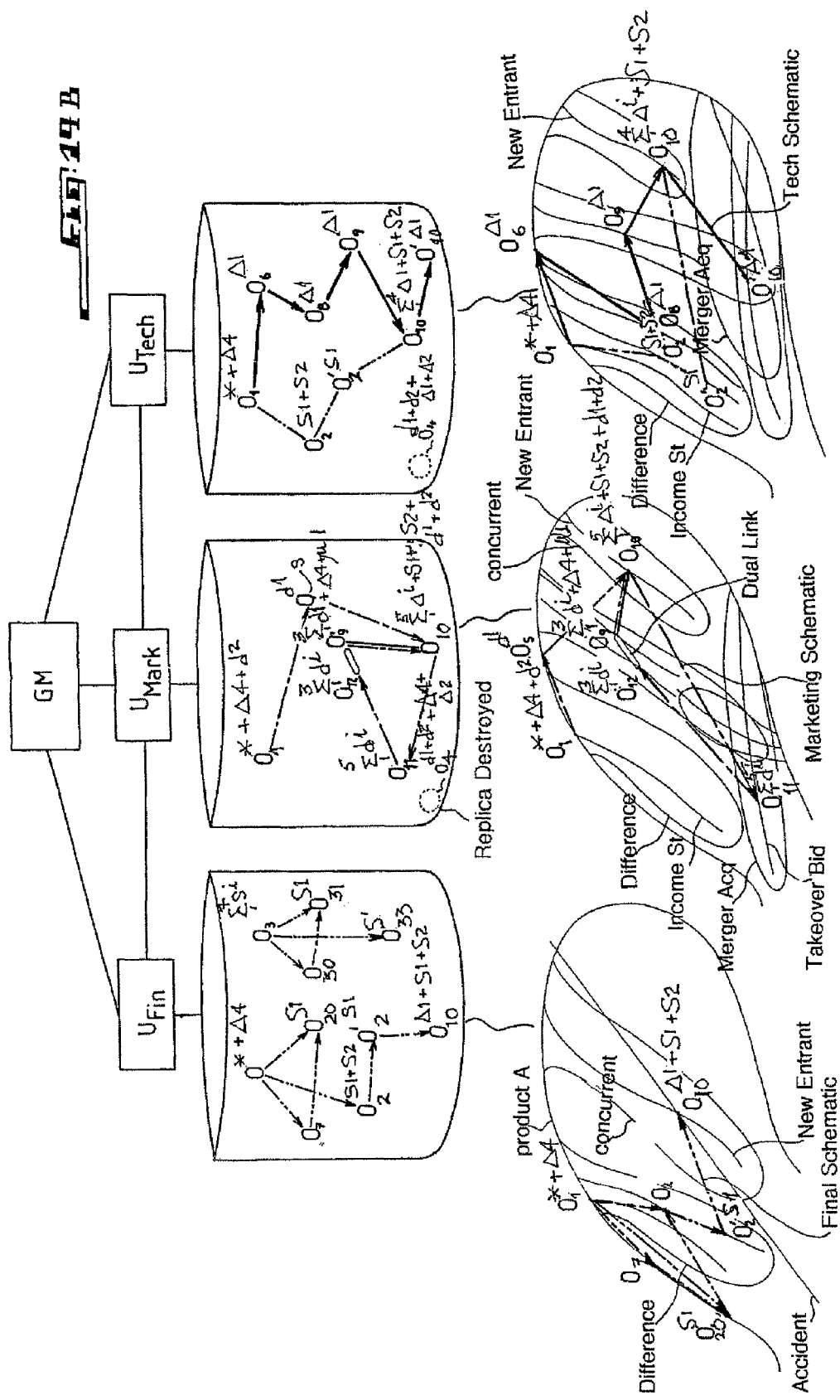

METHOD FOR MONITORING A DECISION-MAKING PROCESS WHEN PURSUING AN OBJECTIVE IN ECONOMIC, TECHNICAL, AND ORGANIZATIONAL FIELDS

FIELD OF THE INVENTION

The present invention concerns a method for controlling a decisional process when pursuing an aim in a specific application domain, such as economic, technical, organizational or the like, and a system for implementing the method.

BACKGROUND

Currently, in the knowledge management domain, information collection with regard to knowledge coming from internal or external sources, such as an intranet or the Internet, and its exchange between different services organized to analyze it and to make decisions in pursuit of a preset aim, requires the systematic intervention of people or users of the services considered.

This known procedure of information processing has the disadvantage of being rather inflexible in its use since it necessitates user presence and intervention for knowledge analysis and exchange and for decision-making and does not systematically use the available ensemble of personal and/or collective knowledge.

Furthermore, each user who collects and analyzes data is flooded with an avalanche of information and tools for its processing.

SUMMARY OF THE INVENTION

The present invention has the aim of eliminating the above-mentioned disadvantages of known systems by proposing a method for controlling a decisional process when pursuing an overall aim in a specific application domain, such as economic, technical, organizational or the like, which is characterized in that a system of agents is created comprising knowledge creator agents of portable knowledge objects and constructor agents of knowledge objects by addition of supplementary knowledge elements to created knowledge objects. The system launches the decisional process by tracking the observation of an abnormality in the actual data of the aforesaid application domain by the creation of an initial knowledge object representing an alarm index and causes several decisional paths to be established linked to this object, under the different points of view of the different agents, each in its domain, and the decision is made following a merger of the decisional paths.

According to one characteristic of the invention, a decision system is created including a group agent constituting a collective knowledge manager called CKM and several agents constituting individual knowledge managers IKM, each in a specific knowledge domain established as a function of the overall aim pursued, which is associated with the CKM agent and each of which has a structure of creator agents and constructor agents of portable knowledge objects.

According to another characteristic of the invention at least some of the individual agents cause the establishment of the aforementioned individual decisional paths.

According to yet another characteristic of the invention the CKM agent is suited to merge the aforementioned individual decisional paths established by IKM agents, thus creating a collective decisional path.

According to yet another characteristic of the invention the decisional paths are established during several decision stages called invariants.

According to yet another characteristic of the invention after searching for knowledge objects representing alarm indices and knowledge objects representing control points correlated thereto, important events comprising accidents are sought, which are linked to an alarm index object and a portable knowledge object created for each accident.

Further, according to another characteristic of the invention, it is examined whether two different portable objects, created by two different agents according to two points of view, are in fact the same world object.

According to yet another characteristic of the invention, it is examined whether two different portable objects have a proximity of characteristics such that they are considered as duals of one another.

BRIEF DESCRIPTION OF DRAWINGS

The invention will be better understood and its other goals, characteristics, details and advantages will appear more clearly in the explanatory description which follows below made with reference to the attached schematic drawings given solely by way of example, illustrating an embodiment of the invention and in which:

FIGS. 2, 3 and 5 illustrate three examples for structuring knowledge in the form of a design tree;

FIG. 9 illustrates schematically the location of the agents GM and $U_{fin}$, $U_{mark}$ and $U_{tech}$ at the end of invariant 3;

FIG. 10 illustrates schematically the implementation by $U_{tech}$ of the merge—connection invariant 4;

FIGS. 14A and 14B illustrate the status of agents GM, $U_{fin}$, $U_{mark}$ and $U_{tech}$ schematically at the end of invariant 5, with their decisional paths.

DETAILED DESCRIPTION

Figure 1:
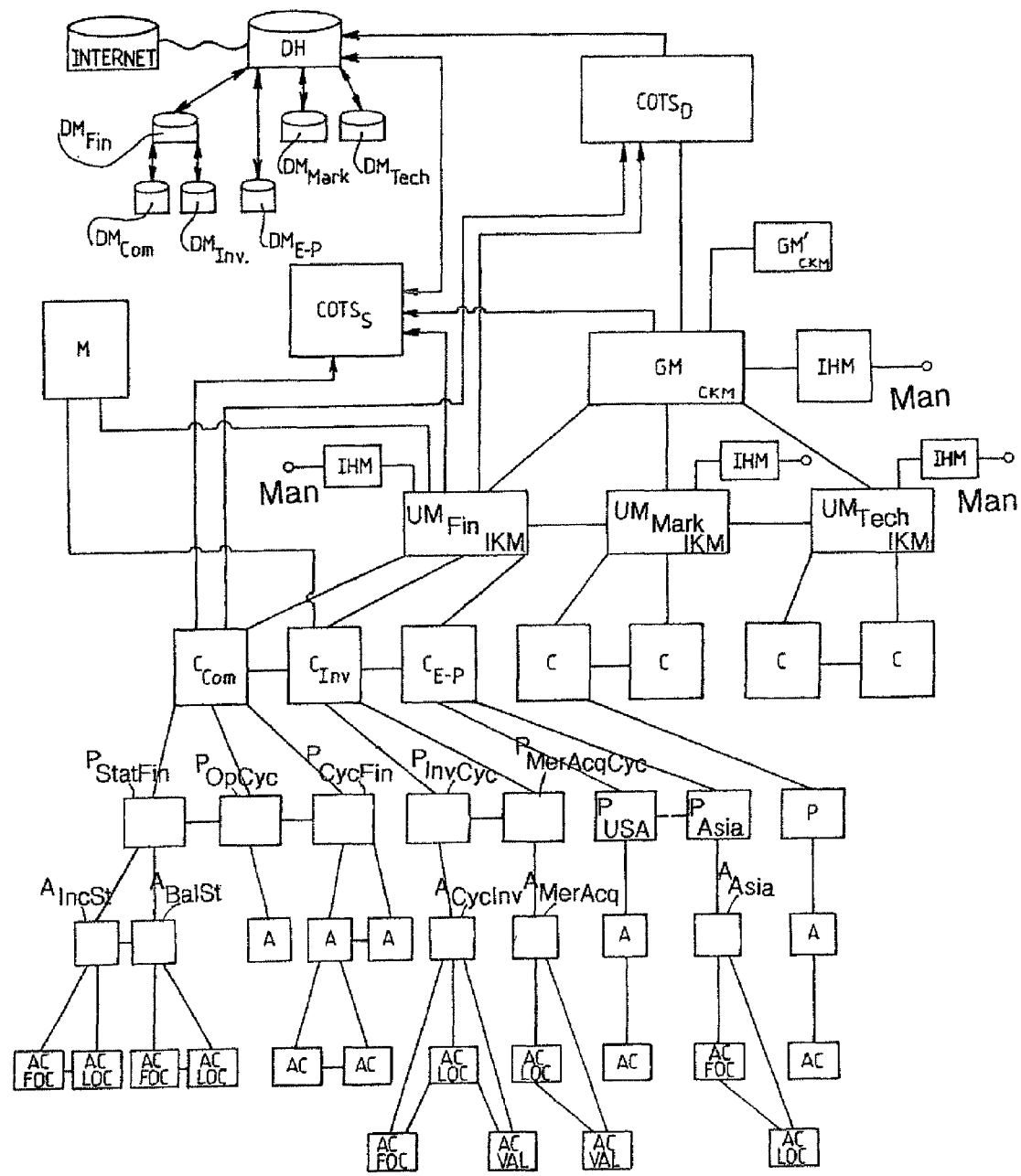
FIG. 1 represents the hierarchized structure of a network of agents for creating knowledge objects and agents for constructing knowledge objects for implementing the method for controlling the decisional process of the invention.

FIG. 1 shows the principle of the structure of a system for controlling a decisional process when pursuing an aim in the specific domain of application, such as economic, technical, organisational or the like.

The system appears in the form of a network of a multitude of data processing agents in a hierarchized structure in the form of a pyramid and organized into loops, each comprising a master agent and at least one child agent, the latter constituting the master agent of a loop of a lower level.

More specifically, the pyramid on FIG. 1 comprises at the top forming the level n a master agent of group GM associated in the example shown with three child agents known as master users UM which form the lower level n-1. Each agent UM controls a certain number of channel agents C forming the level n-2. Associated with each agent C is at least one tracking agent P forming the level n-3. Each agent P has at least one analysis agent A of the level n-4. Associated with each analysis agent A is one or more agents known as cognitive agents AC used to capture or detect the data contained in the scene they observe representative of the application in question.

FIG. 1 shows a fully structured system. It is to be noted that an overall aim might not need all the agents available. The example shown later only needs a more limited network. On FIG. 1, the agents actually used are indicated by index terms. However, as explained subsequently, one of the main special features of the invention resides in the fact that the system gradually structures itself as the decisional process moves forward in the form of a sequence of operations occurring in accordance with the rules of the aim, strategy and action plan which are predetermined and adaptable by the user, but selected for accomplishing an operation according to the results of the preceding operations. To this end, when structuring the loops, in order to carry out its function in the decisional process as part of the pursuit of the overall aim, each agent is provided with aim, strategy and action plan rules.

The decisional process is generally is broken down into decisional stages known as cognitive invariants. In each decisional stage, the overall aim is broken down into strategies and individual aims which propagate from top to bottom inside the network.

More specifically, the structuring of the agents is made from one level of the pyramid to the lower level by successively breaking down the overall aim, for each decisional step, into strategies and individual aims, the strategy of a level of given agents becoming the aim of the agents of the lower level. The pyramid-shaped network then has the fractal configuration shown to the extent that each loop shall be structurally reproduced from level to level.

So that the network is able to be constructed in this way according to an overall aim, the system of the invention comprises services and data structuring agents respectively called $COTS_S$ and $COTS_D$. The services structuring agent $COTS_S$ is designed to be able to determine the services, which are required for the contribution to the carrying out of the overall aim and individual aims, which are available to a master agent of a level i, that will form the agents at a level i-1, and according to predetermined rules. According to the services required to implement an aim and the available services, the structuring agent shall organize the services of the loops. The data structuring agent shall send to each service the data required for carrying out the granted function. The data is stored in a data store DH in the form of packets of multimedia structured data, i.e. digital, textual, image, sound, . . . data, which are structured according to the services of the services structuring agent. The store is a reservoir of multimedia knowledge, that is capitalized, for example, on private servers of the Intranet or Extranet type, which are permanently connected to the Internet communication network, so that it is able to acquire the data it does not have, and thus continually update the information to be used to fulfil the aim.

The system of the invention further comprises a data and services memory device M able to memorize the structure of a network which has been previously constructed for pursuing an overall aim. By means of this memory, the invention is able to quickly reconstruct a previously established network for the same overall aim. During carrying out an overall aim, the memory M stores all the structured data corresponding to each agent.

It is to be further noted that the invention, especially at the level of a group master agent GM and user agents UM, is able to interact with the outside world by means of a man-machine interface IHM. In particular, a person may, at any time, in case and by a substitution to the COTS, enter new services, i.e. new rules, and new data. These interventions of the person and the modifications resultant from the course of the decisional process shall be taken into consideration by the structuring agents and be stored.

The represented network of agents in the form of a pyramid of agents is made up of two vertical portions whose parting line passes between the tracking agents P and the analysis agents A. The analysis loops comprising the analysis agents and their associated cognitive agents are used to create knowledge objects, whereas the agents of higher levels enrich the knowledge objects, as shall be described subsequently. These agents are called constructor agents. The number of levels of constructor agents depends on the overall aim to be completed.

The network of agents is also composed of N horizontal portions, according to the parting lines that separate the agents UM therebetween. Each agent UM and its associated service agents shall correspond to a user and to a so-called IKM individual machine. The agent GM federates, for example, via the Internet or an intranet, a plurality of IKM machines, for constituting a so-called CKM individual machine, designed for a collection of users in a network.

So as to more clearly show the special features of the invention, there now follows by way of non-restrictive example a description of the process for structuring knowledge object constructor and creator agents for which is it necessary to have available a concern to provide a budgetary follow up, the synthesis of the individual decisions being effected by each master agent UM in FIG. 1, that is also the individual knowledge manager of each machine IKM, and the synthesis of the collective decisions being made by a master agent GM in FIG. 1, that is also the collective knowledge manager CKM. The knowledge managers UM and GM interact with the outside world by means of a man-machine interface IHM, an individual machine forming the master user manager agent UM in FIG. 1, and its associated agents, and a collective machine forming the master group agent GM and its associated machines IKM. The budgetary follow up constituting said overall aim comprises several decisional stages, called invariants, namely hereafter the automatic detection of alarm signs, the validation of these indices, the search for accidents, the merger-connection, followed by the interpretation and the decision.

When formulating the overall aim, a person indicates to the collective knowledge manager CKM by means of its interface IHM, the ways and means which must be taken into consideration, such as in the present example the "rapid and low cost" condition, called hereafter cond.1, the state of the machine, the indications concerning the source structure from which the data shall be extracted, and the collective manager profile. Each individual user shall indicate, to the individual knowledge manager IKM, its profile by means of its individual interface IHM. The state of the system could be the initial state or the state that is obtained after an operating reconfiguration following an intervention on a manager CKM or IKM.

The strategy and aim rules according to which the network is established are given in appendix I, but the description which follows shall explain details of their applications in the selected aim of the budgetary follow up.

The generic aim rule of the agent GM determines for the formulated overall aim with matched ways and means the generic strategy 1 broken down into strategies 1.0, 1.1 and 1.2. The purpose of the strategy 1.0 is to structure services, the strategy 1.1 to structure data and the strategy 1.2 is to detect indices (invariant 1).

It is to be noted that the aim and strategy rules still comprise the indication of the invariant and of the ways and means so that the agent to which the message is addressed can correctly carry out its function, as shown in appendix I. For reasons of simplicity, the indications shall no longer be mentioned hereafter, except when this seems necessary.

Pursuant to the strategy rule 1.0, the agent GM sends to the services structuring agent COTs a message "aim 1=strat 1.0 (overall aim, GM)=GM services structuring to carry out the overall aim." In response to the message, this agent searches its memory or queries an external server for the services which are necessary and available for the overall aim.

In the selected aim example (budgetary follow up), three services are available, namely the FINANCIAL, MARKETING and TECHNICAL services. The services structuring agent sends them to the agent GM, which shall then create the financial, marketing and technical master users called $UM_{fin}$, $UM_{mark}$, $UM_{tech}$, terminate the strategy 1.0, and then implement strategy 1.1. According to this rule defined by:

if strat=strat 1.1
if service=service 1 (service$_{fin}$; service$_{mark}$; service$_{tech}$), and if structure=DH the agent GM shall send the aim message "aim 1=strat 1.1 (overall aim; service 1)" to the data structuring agent $COTS_D$ which in response transmits the data in the form of structured knowledge packets corresponding to the services, namely the packets of structured data $DM_{fin}$, $DM_{mark}$, $DM_{tech}$ extracted from the store for storing structured knowledge DH. In the present example, the knowledge is structured in the form of a design tree. Other structuring modes can be used. After receiving the structured data packets, the agent GM terminates the strategy 1.1 and implements the strategy 1.2.

According to the rule of this stage of the process defined by
if strat=strat 1.2
if structure=$DM_{fin}$, $DM_{mark}$, $DM_{tech}$
the agent GM sends the user agent $UM_{fin}$ the aim message "aim=strat 1.2=indices detection."

The agent $UM_{fin}$ has aim and strategy rules it uses to carry out its function within the context defined by the overall aim. Pursuant to its aim rule:
if aim=indices detection and
if structure=$DM_{fin}$,
the agent structures the loop it masters.

This structuring occurs again according to the strategy rules 1.0, 1.1 and 1.2 in three successive stages, as described earlier for structuring of the loop of the agent GM.

According to the strategy rule 1.0, the agent $UM_{fin}$ sends the aim message 1=strat 1.0 to the services structuring agent of the individual knowledge manager IKM which constitutes the agent UM. The structuring agent shall establish that, for the overall aim with matched ways and means, the agent $UM_{fin}$ is able to have services $C_{acc}$, and $C_{inv}$ and $C_{e-p}$, that is, accounting, investment and economic-political services. It is to be noted that at this level of structuring, the economic-political service is added to the two financial services, this service being situated outside the purely financial domain and thus bringing a different point of view.

Obviously, the addition of this new service could also be made by means of a person acting on the agent $UM_{fin}$ via the interface IHM. This configuring of the loop with the service $C_{e-p}$ shall be stored in the memory M and in the $COTS_S$, which forms an enrichment of the $COTS_S$ by the intervention of a person and illustrates the flexibility and adaptability of the system.

After the creation of the above-mentioned services in the loop controlled by the agent $UM_{fin}$ and after the end of the strategy 1.0, and pursuant to the strategy rule:
if strat=strat 1.1 (overall aim) and
if service=$C_{acc}$, $C_{inv}$ and $C_{e-p}$=service 1, and
if structure=$DM_{fin}$
⇒send aim 1=strat 1.1 (overall aim, service 1) to $COTS_D$.

The $COTS_D$ data structuring agent shall send the agent $UM_{fin}$ the packets of digital, textual and image data or the like corresponding to the above-mentioned services, namely the $DM_{acc}$, $DM_{inv}$ and $DM_{e-p}$, the $DM_{acc}$ and $DM_{inv}$ being extracted from the $DM_{fin}$, and the $DM_{e-p}$ being extracted from the data store DH. Then the agent $UM_{fin}$ terminates the strategy 1.1 and now implements the strategy 1.2 according to the strategy rule
if strat=strat 1.2
if structure $DM_{acc}$, $DM_{inv}$, $DM_{e-p}$
⇒sends aim strat 1.2=indices detection by channel to the channel agent $C_{acc}$ and the channel agent $C_{e-p}$.

After structuring of the loop controlled by the agent $UM_{fin}$ and comprising the channel agents $C_{acc}$, $C_{inv}$ and $C_{e-p}$, of which only the agents $C_{acc}$ and $C_{e-p}$ shall be used for the invariant 1, it is proper to structure the loop of each of the two agents $C_{acc}$ and $C_{e-p}$.

This structuring is performed according to the strategy and aim rules matched to each of the two agents. The aim of each agent is the strategy 1.2 of the agent $UM_{fin}$ that is the indices detection per channel. The strategy rules are the-three strategy rules 1.0, 1.1 and 1.2. As before, the strategies 1.0 and 1.1 structures the services and allocates an appropriate data packet to each service.

Thus, the channel agent $C_{acc}$ creates the tracking agents intended for the financial states, the exploitation or operating cycles and the financing cycles called hereafter $P_{state\ fin}$, $P_{cycle\ exp}$ and $P_{cycle\ fin}$ with the appropriate data packets $DM_{state\ fin}$, $DM_{cycle\ exp}$ and $DM_{cycle\ fin}$ which have been extracted by the agents $COTS_D$ from the packet $DM_{acc}$. The strategy rule 1.2 causes the agent $C_{acc}$ to send the strategy message strat 1.2=index detection per track to the agent $P_{state\ fin}$ as the aim to be implemented.

Pursuant to the strategy rules 1.0 and 1.1, the channel agent $C_{e-p}$ creates the tracking agents intended for Iraq and Asia and called $P_{Iraq}$ and $P_{Asia}$. The rule 1.2 causes the agent $C_{e-p}$ to send the strategy message strat 1.2=index detection per track to the agent $P_{Asia}$ as the aim to be implemented.

The next stage is the structuring of the loop of each tracking agent according to the strategy and aim rules. The aim rule being
if aim=local aim 1=indices detection per track with the matched ways and means, it is appropriate to apply the strategy rule strat=strat 1.0 which informs the tracking agent to select the number of analysis agents A and, according to the strategy 1.1, the latter sends the analysis agents the aim to be achieved, namely the aim message
aim=strat 1.1=search for alarm indices.

By proceeding in this way, the tracking agent $P_{state\ fin}$ creates result account analysis agents $A_{ra}$ and balance sheet $A_{balance\ sheet}$ and the knowledge $DM_{RA}+DM_{balance\ sheet}$. The tracking agent$_{Asia}$ creates a single analyzer agent, namely the agent $A_{Asia}$ with $DM_{Asia}$.

Each analyzer agent works according to the aim and action plan rules. Generally speaking, these rules are as follows:

Aim rule
  if aim=local aim 1=search for alarm indices
  ⇒apply plan=plan 1.
Plan rule
  if plan=plan 1
  ⇒create N cognitive agents (according to condition 1)
  ⇒apply plan 1 to the cognitive agents.

In the present budgetary follow up example as the overall aim, only the agent $A_{RA}$ is used and this analyzer agent creates two cognitive agents, namely a focusing agent FOC which is a detector of small signals in the scene established by $DM_{RA}$ and a localization agent LOC for detecting design branches. Pursuant to plan 1, the analyzer agent sends the agent FOC the request to search for small signals in the appropriate scene. After detecting a small signal to be retained, considered as a knowledge object $O_i$, the agent FOC sends a request to the agent LOC for the latter to establish the context in which the object $O_i$ is situated, this context then constituting another knowledge object $O_j$. After the return of the request to the agent FOC with the result, this agent sends the object $O_i$ enriched by the placing in context according to $O_j$ back to the analyzer agent.

The knowledge objects have the predetermined structure shown hereafter and comprising a certain number of domains. Each domain has a knowledge object aspect. The terms appearing in brackets are several examples shown to illustrate the nature of the domain in question.
  →ID (identity)
  →Type (Ex: index, control point, mark point, recognized object . . . )
  →Context (Ex: subject of paragraph, geographical environment of an object in an image . . . )
  →Forms (per form creator) (Ex: Paragraph, LOC creator; Word, FOC creator . . . ) (type; elementary or composite) (Ex: tree, branch, doc, images elements, numerical value)
  →Property (Ex: Risk zone, strategic zone, under surveillance zone, numerical value deviation . . . )
  →Use (Ex: Contents name, name of a technician, competitor, partnership . . . )
    →Links (per link creator) (with a type)
    →Media (Image, text, sound)
    →Alarm
    →Source
    _Creator (FOC, . . .

The links between knowledge objects are of various types:
  →Contained in
  →Derived from
  →Physically close (in a text or image)
  →Semantically close (synonym, identical expression . . . )
  →Logically associated
  →High, low attraction, . . .

More specifically, the generation of knowledge objects by a cognitive agent is made pursuant to expert rules. The rules of the object FOC are the following:
  if aim=search for small signals, and
  if structure=$DM_{CR}$, formed, for example, by digital values issued from an integrated managing software package of accountancy
  ⇒use know-how 1=calculate signals of the "instrument panel"
  ⇒use know-how 2=alarm signal detection in digital source values
  ⇒if signal amplitude greater than the threshold to create $O_1$ so that
    →Id
    →Type (index)
    →Creator (FOC)
    →Form (skeleton type, FOC creator, structure $DM_{RA}$ form=numerical value $\Delta X$, media=source numerical values)
    →Property (Instrument panel deviation)
  ⇒send the message for establishing the $O_1$ context to the agent LOC in $DM_{RA}$.

The calculation of the instrument panel signals consists of establishing the values of the current parameters of the economic activity of the company in the data structure $DM_{RA}$ and of comparing them with the logging parameters which must be observed. The results $\Delta X$ of this comparison form the above-mentioned signals. If from among the signals established certain signal values exceed a predetermined threshold, the cognitive agent FOC creates the knowledge object $O_1$ representative of the alarm index.

There now follows a description of how the cognitive agent FOC functions by referring to FIG. 2 which shows the structure of knowledge contained in the knowledge packet $DM_{RA}$. The structure of this data is represented in the form of images, the first representing the result accounts in the form of a design tree. The structure in the form of a design tree is known. FIG. 2 explains certain terms used for the knowledge objects. The tree represented comprises a certain number of branches, three being shown and representing sales ca, charges ch and results res. Attached to each branch is a certain number of sub-branches, only one being shown. This, denoted by P, concerns the products commercialized by the company proceeding with the budgetary follow up. These products are represented on the sub-branches by the points PA, PB . . . It is to be noted that on the image represented, each product can be identified by the coordinates of the point it represents on the image.

By applying the first and second know-how rules, the agent FOC establishes in the sources data of the structure of knowledge $DM_{RA}$ the insignificant alarm signals situated above the reference threshold. The points, which in the design tree $DM_{RA}$ are representative of the retained alarm signals, shall be differentiated from the environment, for example illuminated, by the cognitive agent FOC. On FIG. 2, a point is lit up on the sub-branch p of the branches ca, ch and res. It is these retained signals which give rise to the creation by the agent FOC of the knowledge object $O_1$. This object is of the index type, has been created by the agent FOC and has a "skeleton" shape; that is, it is formed by rare points which so far have not been connected. Its property is that the indices are numerical values in the source data. In the structure of the knowledge object $O_1$, the domains type, creator, shape and property are already defined when creating the object.

Then in accordance with the rules of the agent FOC, when an object $O_1$ has been created, the agent sends a message requesting that the context of the object $O_1$ be established to the cognitive agent LOC. So as to carry out this request, the agent LOC applies the know-how rules and the following generic context creation rules:
  If aim=establishing context, if structure=$DM_{CR}$
  ⇒use know-how 1 Concept branch contour detection per common property (which detects one branch which contains $O_1$)
  ⇒If a common property exists at the points defining the form of $O_1$, define a branch as being the context of the object $O_1$ and create $O_7$
    →Id
    →Type(recognized object)
    →Creator (LOC $A_{CR}$)
    →Form (type=zone, creator LOC, Structure=$DM_{CR}$, form=design branch, media=design tree
    →Use (product A)
    →Connected to $O_1$ (creator LOC, type=contained in)

⇒Update $O_1$ so that $\delta^1 O_1$
→Context (product A)
→Connected to $O_7$ (creator LOC, type=context of)
→cat=1 (an index object of a category 1 is contained in its context
⇒return to FOC ($O_7$, $\delta^1 O_1$)

Pursuant to these rules, the function of the agent LOC consists of searching to see if the differentiated points on FIG. 2 have at least one common characteristic. By referring to the data subjacent to the image of the tree, the agent LOC checks that the three illuminated or differentiated points on FIG. 2a are representative of the product PA. This product thus is revealed as constituting the context in which the object $O_1$ is situated. Accordingly, the agent LOC creates the object $O_7$ specified above and updates the object $O_1$ by creating $\delta^1 O_1$. Then the agent LOC sends the objects $O_7$ and $\delta^1 O_1$ back to the agent FOC.

The agent FOC then applies the rule for creating the following small signals:

if aim=search for small signals (plan 1), if return of request for establishing context $(O_1)=(\delta^1 O_1, O_7)$, ⇒Make following inference. If form $(O_1)$ numerical value $\Delta X$>threshold 1, if context $O_1$=Product PA, then update $O_1$ so that $\delta^2 O_1$, →interest=1

⇒return to agent $A_{RA}$ ($O_1^{\delta1+\delta2} O_7$) and terminate plan 1.

In other words, the agent FOC, after receiving the response to its drawing up context request, updates the object $O_1$ according to the conditions specified earlier by adding to the object $O_1^{\delta1}$, that is, updating by the agent LOC, the element $\delta^2$ which indicates that the object $O_1$ has an interest=1. In the structure of the object $O_1$ appears the interest domain=1. After this updating of the object $O_1$ by adding the elements $\delta^1$ and $\delta^2$, this domain is sent back to the analyzer agent $A_{RA}$ in its enriched version $O_1^{\delta1+\delta2}$, accompanied by the objects which have been created at this particular time, that is $O_7$.

The relocation with, if applicable, the updating of the knowledge objects to the agent GM at the top of the pyramid is effected according to the return and updating rules which are appropriate to the various agents located on the circumferences of the objects. These rules are clearly dependent on the invariant which is implemented in the overall aim and the matched ways and means.

These rules in the budgetary follow up example are summed up as follows:

Rule of the Analyzer Agent: A
If aim=search for indices, if end plan 1 $(O_1^{\delta1+\delta2}O_7)$
if interest $(O_1^{\delta1+\delta2})=1$ if type $(O_1^{\delta1+\delta2})$=index
⇒carry out $\delta^3 O_1^{\delta1+\delta2}$
→alarm=1
⇒carry out $O_1^{\delta1+\delta2+\delta3}$
⇒return to parent of $(O_1^{\delta1+\delta2+\delta3}, O_7)$
Rule of Agents P, C
If aim=indices detection per track (or per channel) and if return of aim=$(O_1^{\delta1+\delta2+\delta3}, O_7)$
⇒copy $(O_1^{\delta1+\delta2+\delta3}, O_7)$
⇒return to parent of $(O_1^{\delta1+\delta2+\delta3}, O_7)$
Rule of the agent UM
If aim=index detection, if aim return=$(O_1^{\delta1+\delta2+\delta3}, O_7)$
⇒display $(O_1^{\delta1+\delta2+\delta3}, O_7)$ at the IKM of the IKM in structure located in the Form domain
Rule of the Agent GM
If aim=overall aim, if return of strat 1.2=$(O_1^{\delta1+\delta2+\delta3}, O_7)$
⇒make copy $(O_1^{\delta1+\delta2+\delta3}, O_7)$
⇒display $(O_1^{\delta1+\delta2\delta3}, O_7)$ at the IHM of CKM.

In accordance with these rules, the analyzer agent $A_{RA}$ associates with the object $O_1^{\delta1+\delta2}$, which has been recognized that it is of interest and is of the index type, the element $\delta^3$, which indicates that the object $O_1$ must be considered as indicating an alarm. The analyzer agent updates the object $O_1$ by establishing $O_1^{\delta1+\delta2+\delta3}$. The analyzer agent has also received the knowledge object $O_7$ and sends the updated objects $O_1^{\delta1+\delta2+\delta3}$ and $O_7$ to the tracking agent $P_{state\text{-}fin}$.

Then these two objects $O_1^{\delta1+\delta2+\delta3}$ and $O_7$ return to the agent GM without being modified by passing through the tracking agents p, then channel C and user $UM_{fin}$. In the master user agent $UM_{fin}$, the knowledge objects are displayed at the Man-Machine interface IHM of the individual knowledge manager IKM. In the master group agent GM, the objects are also displayed at the Man-Machine interface IHM of the collective knowledge manager CKM.

After having described the creation and construction of the knowledge objects $O_1$ and $O_7$ by the agents FOC and LOC of the analyzer agent $A_{RA}$ and their returning to the agent GM, there now follows a description of the work to be carried out by the focusing FOC and localization LOC agents of the analyzer agent $A_{Asia}$ pursuant to the plan and strategy rules generally mentioned earlier. The agent FOC is an agent for detecting the density in a design tree and it acts according to the following rules:

If aim=search for small signals, if structure=$DM_{Asia}$, for example formed of textual data issued from a software package for an electronic managing of documents, known per se ⇒use know-how 1=[structuring per country and create $DM_{Asia}$ (Country)]

⇒use know-how 2=detection of alarm signals in the primary tree

⇒if signal surface>threshold 1, create $O_3$ so that:

→ID

→(Index type)

→Form (type=zone, creator FOC, structure=$DM_{Asia}$ (Japan), index=Company passing through a crisis in Japan, form=design branch, media=design tree)

→Property (design tree density)

⇒request establishing of context on $O_3$ at LOC in $DM_{Asia}$)

Rule for Creating Small Signals

If aim=search for small signals (plan 1), if return for request of establishing context on $O_3$=$(\delta^1 O_3, O_{30})$ ⇒Make following interface: if $O_{30}$ linked to $O_3^{\delta}$ with link type=context connected from, if context $(O_3^{\delta1})$=company with shares going down, if type of form $(O_1^{\delta1})$=zone, then update $O_3$ so that $\delta^2 O_3^{\delta1}$ →interest=1

→cat=2 (an index object of a category 2 has its context at the periphery thereof and the pertinent information is more in the context than in the index)

→return to $A_{Asia}$ from $(O_3^{\delta1+\delta2}, O_{30})$ and terminate plan 1

The agent LOC acts according to the following rules:

If aim=requesting establishing context on $O_3$,
if structure=$DM_{Asia}$

⇒use know-how 1=context branch detection

⇒if branch density>threshold 1 if branch density connected to $O_3$, then create $O_{30}$ (context) so that:

→Id

→Type (recognized object)

→Creator LOC ($A_{Asia}$)

→Form (type=task, creator LOC, structure $DM_{Asia}$, index, form=design branch, media=design tree)

→Use=(company with falling shares)
→Connected to ($O_3$: creator LOC, type=context connected from)
⇒update $O_3$ so that
$\delta^1 O_3$
→Context=(company with falling shares)
→Connected to ($O_3$: creator LOC, type=related context with
⇒return to FOC from ($O_{30}$, $\delta^1 O_3$).

The know-how rule 1 of the agent FOC in the aim for searching small signals consists of carrying out a structuring per country of data $DM_{Asia}$. The data contained in this data packet is structured in the form of a design tree known in this domain. FIG. 3 shows a zone devoted to companies in Japan. This zone is formed by points, each representing one company of this country without particular characteristics. It is therefore necessary to consider what can be of interest around this object. This defines the objects of the category 2. Pursuant to the know-how rule 2, this zone is detected by the agent which gives rise to the creation of the knowledge object $O_3$ with the domains indicated above.

Still pursuant to these rules, the agent FOC sends a request for establishing the context of the object $O_3$ to the agent LOC in the data structure $DM_{Asia}$. It is to be noted that the term in the property domain "design tree density" means that a poorly defined zone is observed but identified with a particular density of the tree.

In response to the request, the agent LOC is addressed in the design tree to the task of a small surface but a high density represented at the periphery of the zone forming the knowledge object $O_3$ which represents companies with falling shares. If this zone has a density exceeding a threshold value, the agent creates the knowledge object $O_{30}$, which has the structure indicated earlier, which is of the recognized object type and has inscribed in its use domain "company with falling shares." The object $O_{30}$ is connected to the object $O_3$.

After updating of the object $O_3$ so that it appears in the form $O_3^{\delta1+\delta2}$, this object and the object $O_{30}$ are sent by the agent FOC to the analyzer agent $A_{Asia}$. The latter adds to the object $O_3^{\delta1+\delta2}$ the element 53 indicating that the object $O_3$ constitutes an alarm cause.

Then the knowledge objects $O_1^{\delta1+\delta2+\delta3}$ and $O_{30}$ are sent to the agent GM at the top of the pyramid according to the transmission rules referred to earlier when returning the objects $O_1^{\delta1+\delta2+\delta3}$ and $O_7$.

With the return to the agent GM of the objects $O_1^{\delta1+\delta2+\delta3}$, $O_7$, $O_3^{\delta1+\delta2+\delta3}$ and $O_{30}$ completes the implementation of the invariant 1 of the index detection in the "speed and low cost" conditions, within the overall aim of the budgetary follow up.

Figure 4:
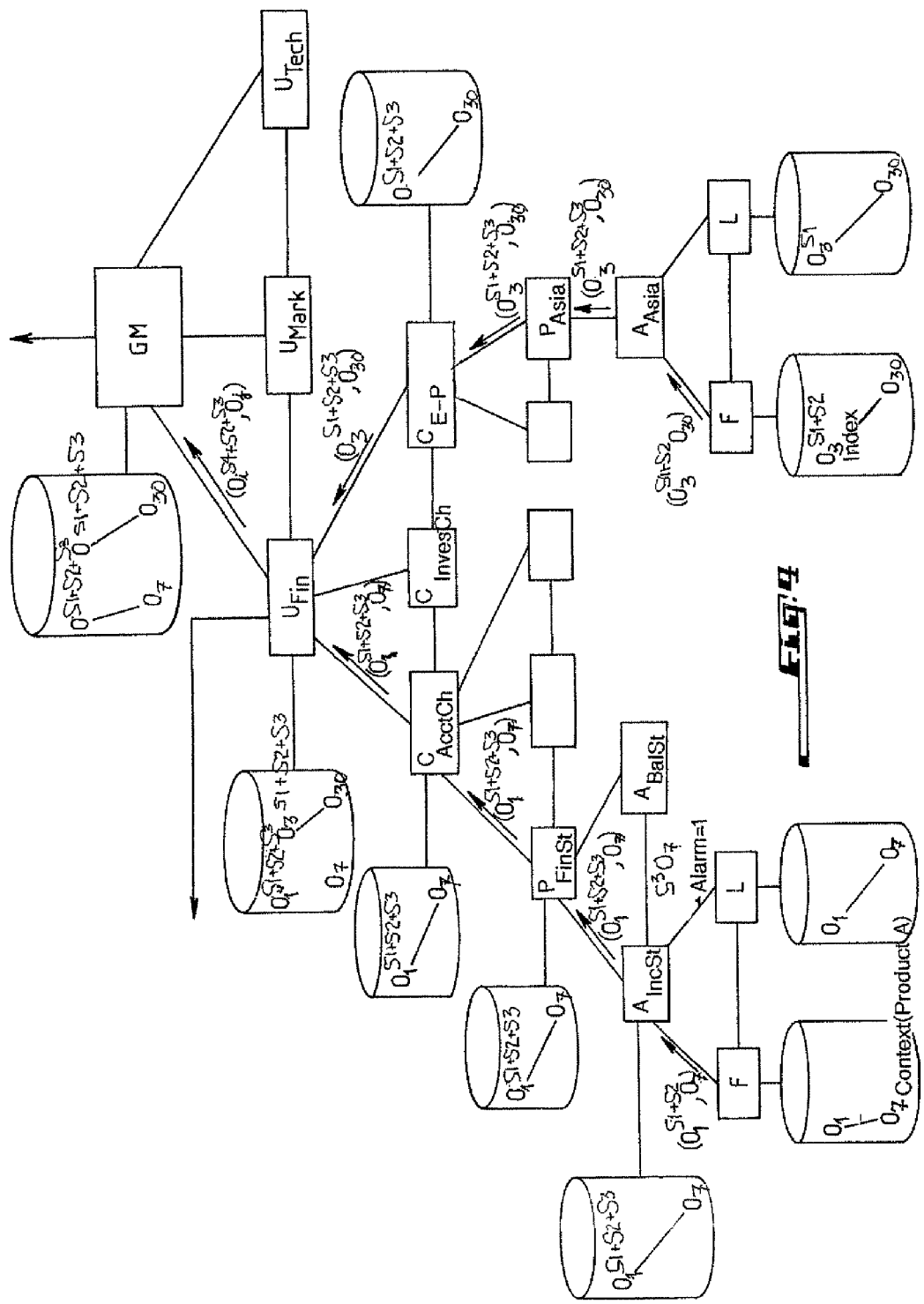
FIGS. 4 and 6 diagrammatically illustrate the creation and construction of knowledge objects within the context of the cognitive invariant 1 and the cognitive invariant 2.

FIG. 4 illustrates the creation and relocation of the knowledge objects when implementing the invariant 1 and their display at the Man-Machine interfaces IHM of the collective CKM and individual IKM knowledge managers, the individual one being associated with the agent $UM_{fin}$. The figure shows the knowledge objects stored in the storage devices DST of the various agents with the links between the objects. The arrows symbolize the relocations of the knowledge objects which are associated with the arrows.

The system of the invention then implements the invariant 2 residing in the validation of the knowledge objects which have been created and constructed during the carrying out of the invariant 1.

The example illustrates operation in a mode in which the invariants following the invariant 1 shall be made in the same IKM, i.e., that of the financial user.

The implementation of the invariant 2 is carried out according to the predetermined aim, strategy and plan rules adaptable by the user and defined according to the way in which the invariant 1 has been implemented and knowledge objects resulting from the invariant 1. The generic aim, strategy and structuring rules within the context of the invariant 2 of the agents GM, UM, C and P are given in appendix II.

The invariant 2 is effected in an asynchronous way relative to the invariant 1. It can be triggered upon arrival of a first alarm index to the agent GM and can be executed in parallel with execution of the invariant 1.

Thus, as it can be seen in appendix II, the aim rule of the master group agent GM in the budgetary follow up may require the joint application of strategy 1.2 for detecting indices and strategy 2 for validation when implementing the invariant 2. The strategy 2 rule for validation requires the agent GM:

if strat=strat 2 ($O_1$, overall aim, condition 1, profile, state DH)
if service associated with agent=$UM_{fin}$, $UM_{mark}$, $UM_{tech}$=service 1
for transmitting the strategy message=validation to the agent $UM_{fin}$ if the structured data are clearly the data which have been associated with the above-mentioned services when implementing the invariant 1, namely, the data $DM_{fin}$, $DM_{mark}$ and $DM_{tech}$.

The agent $UM_{fin}$, according to its aim rule and pursuant to its strategy rule, sends a message of aim 1=strat 2.2=validation per channel to the agent $C_{inv}$ which has been established when implementing the invariant 1. However, since at the time of repositioning the invariant 1, the loop of the agent channel $C_{inv}$ has not been formed, this agent must establish it now.

In fact, according to its aim rule "if aim=local aim 1" according to the conditions of the established knowledge objects and with the constraint "speed, low cost," the agent $C_{inv}$ must apply the strategy rule strat=strat 2. The carrying out of this strategy involves the structuring of the services according to the strategy 1.0 described earlier when describing the implementation of the invariant 1. This strategy 1.0 requires that the agent $C_{inv}$ send a message requesting services structuring to the service structuring agent $COTS_S$. Pursuant to its rules, the structuring agent establishes that, for implementing the overall aim in accordance with the given conditions, the agent $C_{inv}$ is able to have available "cycle-investment" and "merger-acquisition" services. The agent $C_{inv}$ then creates the two services $P_{cycle\ inv}$ and $P_{mer-acq}$. The data structuring agent $COTS_D$ also sends appropriate structured data, namely the data packets $DM_{cycle\ inv}$ and $DM_{mer-acq}$. The agent $C_{inv}$ is now able to implement its strategy 2.2 for validating the knowledge objects $O_1^{\delta1+\delta2+\delta3}$ and $O_3^{\delta1+\delta2+\delta3}$.

According to the strategy rule for validating the object $O_1$ in its completed version $O_1^{\delta1+\delta2+\delta3}$ in accordance with the conditions defined by
if form $O_1$ extracted from the structured data $DM_{RA}$,
if property of $O_1$ numerical value deviation in management report
the agent $C_{inv}$ sends a message of aim 1=strat 2.2=validation per track on the object $O_1$ to the tracking agent $P_{cycle\ inv}$.

Pursuant to its strategy rules for validating the object $O_3$ in its enriched version $O_3^{\delta1+\delta2+\delta3}$, by implementing the strategy 2.2 in accordance with the conditions defined by
if form of $O_3$ is extracted from the data $DM_{Asia}$,
if property of $O_3$=design branch density,
the agent $C_{inv}$ sends the message of
aim=strat 2.2=validation per track
on the object $O_3$ to the tracking agent $P_{mer-acq}$.

It shall be observed that because the object $O_1$ has been extracted from the accounting domain and is an alarm on the numerical values of the management report, in fast strategy it is validated on the investment cycles. On the other hand, the object $O_3$, which has been extracted from the economic-political domain and is an alarm on a density of points in the knowledge tree, in fast strategy it is validated in the "merger-acquisition" domain.

According to the aim and strategy rules, already described in the description in executing the invariant 1, the tracking agents must select the number of analyzer agents.

Pursuant to these aim rules=local aim=validation per track on the object $O_1$ requesting the implementation of the strategy 1=control point search, the tracking agent $P_{inv}$ creates an analyzer agent, namely the agent $A_{cycle\ inv}$ and sends the aim message=strat 1=control point search to this agent.

The tracking agent $P_{mer-acq}$, according to its aim rule "if aim=local aim 1=validation per track on $O_3$", pursuant to the strategy strat=strat 1 which ensues from this creates an analyzer agent, namely the agent $A_{mer-acq}$, and sends the message aim 1=strat 1=control point search on $O_3$ to the agent $A_{mer-acq}$.

As this has also been explained earlier at the time of describing the execution of the invariant 1, the analyzer agents implement aim and action plan rules to carry out the validation operations.

There now follows a detailed explanation of the work of the analyzer agents according to their aim and action plan rules.

The analyzer agent $A_{cycle\ inv}$ implements the plan and aim rules according to the fact that the index $O_1$ is from the category 1 and that the alarm is triggered on a numerical value deviation property in the management report. For the implementation of the plan, the agent $A_{cycle\ inv}$ creates 3 cognitive agents, i.e. LOC=detector of design branch; FOC=detector of signals TB; VAL=detector of correlation.

The analyzer agent $A_{cycle\ inv}$ shall first send a request to the context precision agent LOC. The agent LOC implements the following aim rule:

If aim=state context of $O_1^{\delta1+\delta2+\delta3}$ (plan 1, overall aim, $DM_{cycle-inv}$, $DM_{RA}$),
if form $O_1$ extracted from $DM_{RA}$ if form type=skeleton, if context
$O_1$=product A, if $O_1$ linked to $O_7$ of type=context of
⇒use know-how 1=detect design branch contour on criterion describing the context of the object $O_1$ in $DM_{cycle\ inv}$
⇒create $O_{20}$ (design branch)
→ID
→Type (mark point)
→Creator LOC ($A_{cycle\ inv}$)
→Form (type=zone, creator LOC, structure $DM_{cycle\ inv}$, index, form=design branch, media=design tree)
→Connect to ($O_1$: creator LOC, type=linked by the context ($O_1$), $O_7$: creator LOC, type=describing context)
⇒update $O_1^{\delta1+\delta2+\delta3}$
Connected to ($O_{20}$: creator LOC, type=connected by the context ($O_1$))
⇒make request for establishing small signals on $O_{20}$ in $DM_{cycle-inv}$ to FOC
⇒if return from FOC=($\delta^1 O_{20}, O_2$), update $O_{20}$ in LOC: $\delta^1 O_{20}$
⇒return to parent agent ($\delta^4 O_1^{\delta1+\delta2+\delta3}, O_{20}^{\delta1}, O_2$
→Connected to ($O_2$: creator FOC, type=contains)

From the plan rules, the agent $A_{cycle-inv}$ creates three cognitive agents, namely a localization agent LOC formed by a design branches contour detector, a focusing agent FOC formed by an management report signals detector (TB), and a validation agent VAL formed by a correlation detector. The analyzer agent $A_{cycle\ inv}$ sends a context precision request concerning the object $O_1^{\delta1+\delta2+\delta3}$ to the agent LOC in an investment cycle knowledge domain $DM_{cycle\ inv}$e, whereas the index has been created in an accounting knowledge domain $DM_{acc}$. This implements the multi-point-of-view analysis inside a machine IKM. The agent LOC must detect a contour in the structured knowledge design tree $DM_{cycle-inv}$, on criterion connected to the context of the index. This criterion concerns the product PA. The cognitive agent shall illuminate the points concerning the product PA in the design tree diagrammatically shown on FIG. 2. The design tree corresponding to the structured knowledge tree $DM_{CR}$ according to FIG. 2 has for its branches sales ca, charges ch, and results res. But in the tree $DM_{cyle-inv}$ the branches constitute the Research-Development stations (R & D), Commercial COC and Production FA. On FIG. 2, the agent LOC shall illuminate the points on the products sub-branches P the points representing the product PA. The contour surrounding the product PA in the design tree $DM_{cycle-inv}$ constitutes the knowledge object created by the agent LOC. This object is of the mark point type, has the form type zone, form design branch, media=design tree and is connected to $O_1$ by the context $O_7$. This creates a new knowledge element $\delta^4 O_1$ and the agent LOC updates the object $O_1^{\delta1+\delta2+\delta3}$ which then becomes $O_1^{\delta1+\delta2+\delta3+\delta4}$.

Then the agent LOC sends a request to the agent FOC so that the latter can establish small signals concerning the object $O_{20}$ in the structure $DM_{cycle\ inv}$. The agent FOC implements the know-how rules as defined hereafter:

If aim=establish small signals on $O_{20}$, if structure=$DM_{cycle\ inv}$, if form type ($O_{20}$=design tree)
⇒use know-how 1=calculation of management report signals (TB) in structure $DM_{cycle-inv}$
⇒if signals amplitude>threshold 1, if source values signals surface>threshold 2, create $O_2$ so that:
→ID
→Type (index)
→Creator FOC ($A_{cycle\ inv}$)
→Form (type=skeleton, creator FOC), structure $DM_{cycle-inv}$, index, form=numerical value, media=numerical value in $DM_{cycle-inv}$
→Property (Deviation TB)
→Connected to ($O_{20}$: creator FOC, type=contained in
⇒update $O_{20}$:
$\delta^1 O_{20}$
→Connected to ($O_2$: creator FOC, type contains)
⇒return to LOC ($\delta^1 O_{20}, O_2$)

Pursuant to these rules, the agent FOC establishes management report small signals in the structure $DM_{cycle-inv}$. If the agent FOC detects signals with an amplitude exceeding the threshold 1, it creates the object $O_2$ indicated earlier which is of the index type, a form of the skeleton type and represents a numerical value by being connected to the object $O_{20}$ by a link of the "contained in" type. By referring to FIG. 2, it can be seen that the object $O_2$ is located inside the contour $O_{20}$ on the products sub-branch P of the branch K & D. This brings a knowledge element $\delta^1 O_{20}$ to the object $O_{20}$ and enables the agent FOC to update the object $O_{20}$ so that the latter becomes $O_{20}^{\delta1}$. Then the agent FOC sends back to the agent LOC the objects $\delta^1 O_{20}$ and $O_2$. After the return of $\delta^1 O_{20}$ and $O_2$ to the agent LOC, the latter updates the object $O_1$ according to $\delta^4 O_1$ which then becomes $O_1^{\delta1+\delta2+\delta3+\delta4}$. Then the rules of the agent LOC make the latter send the elements $\delta^4 O_1^{\delta1+\delta2+\delta3}+$, $\delta^1 O_{20}$ and $O_2$ to the agent $A_{cycle\ inv}$. This agent then asks the validation cognitive agent VAL to specify the objects $O_1^{\delta1+\delta2+\delta3+\delta4}, O_{20}^{\delta1}, O_2$ according to the following validation know-how rules:

If aim=specify ($O_1^{\delta1+\delta2+\delta3+\delta4}$, $O_{20}^{\delta1}$, $O_2$), (plan 1 in $DM_{cycle\ inv}$, $DM_{RA}$)
  if type $O_2$=index, if property $O_2$=deviation TB, if $O_2$ linked to $O_{20}$ and of type=contained in, if $O_1$ and $O_{20}$ linked by the context
  ⇒use know-how 1 search=for correlation between $O_1$, $O_2$, $O_{20}$ by common characteristic
    ⇒if result of know-how 1=$\delta^5 O_1$, update $\delta^5 O_1$
    →Connected to $O_2$ (creator VAL, type=correlation by the context of $O_1$)
    $\delta^1 O_2$
    →Type=(index: control point)
    →Connected to $O_1$ (creator VAL, type correlation by the context of $O_1$)
    ⇒return to parent ($\delta^5 O_1$, $\delta^1 O_2$, $O_{20}^{\delta1}$)

According to its index precision rule of category 1, the agent VAL, by using its correlation search know-how, shall establish that the objects $O_1$ and $O_2$ are linked because they both concern the product PA. The two objects are therefore correlated by the context PA, which constitutes the new knowledge element $\delta^5 O_1$ connected to $O_2$ and of the correlation type indicated earlier, as well as the new element $\delta^1 O_2$ of the control point/index type connected to $O_1$. After being updated, the knowledge objects $O_1^{\delta1}$ to $\delta5$, $O_2^{\delta1}$ and $O_{20}^{\delta1}$ are sent to the analyzer agent $A_{cycle-inv}$ which terminates validation of the knowledge object $O_1$. The validation has made it possible to establish the object $O_2$ constituting a deviation in the R & D domain of the $DM_{cycle-inv}$ as a control point of the alarm, index object $O_1$.

During the validation with support search carried out on the object $O_1$, the analyzer agent $A_{mer-acq}$ caries out validation of the object $O_3$.

So as to carry out this function, the agent $A_{mer-acq}$ acts according to the following plan and aim rules:
  Aim rule
  If aim=local aim 1=search point of support ($O_3$, overall aim Cat 2) in $DM_{fus-acq}$, $DM_{Asia}$
    ⇒plan=plan 1 ($O_3$, overall aim, cat 2, $DM_{fus-acq}$, $DM_{Asia}$)
  Plan rule
  If plan=plan 1 ($O_3$, overall aim cat 2, $DM_{fus-acq}$, $DM_{Asia}$)
    ⇒create two cognitive agents: LOC=design branch detector and VAL=correlation detector
    ⇒send request 1 to LOC=state context of $O_3$ (plan 1, $DM_{fus-acq}$, $DM_{Asia}$)
    ⇒if return of request ($\delta^4 O_3$, $O_{31}$), send request to VAL ($O_3$, $O_{31}$)
    ⇒if end of request=2=($\delta^5 O_3$, $O^{\delta1}_{33}$, $\delta^1 O_{31}$), return to $A_{Asia}$ ($\delta^5 O_3 \delta^1 O_{31}$, $O^{\delta1}_{33}$)

More specifically, the agent $A_{fus-acq}$ creates two cognitive agents, namely a localization agent LOC formed by a design branch contour detector on criterion, and a validation agent VAL which is a correlation detector. By implementing its plan rule, the agent $A_{Asia}$ sends a request to the agent LOC asking it to specify the context of the object $O_3$ in the structured knowledge domain $DM_{fus-acq}$.

In response to this request, the agent LOC implements its following context-precision rule:
  if aim specify context of $O_3^{\delta1+\delta2+\delta3}$, (plan 1, overall aim, $DM_{fus-acq}$, $DM_{Asia}$), if context $O_3$=company with shares falling, if form $O_3$ extracted from $DM_{Asia}$, if $O_3$ linked to $O_{30}$ of type=context of
  ⇒use know-how 1=detect design branch contour on criterion describing the context of the object $O_3$ in $DM_{fus-acq}$
    ⇒create $O_{31}$ (design branch)
    →ID
    →Type (mark point)
    →Creator LOC ($A_{fus-acq}$) structure $DM_{fus-acq}$, form design branch, media=design tree)
    →Connected to $O_3$ (creator LOC, type linked by the context of $O_3$, $O_{30}$: creator LOC, type=describing context)
    ⇒update $O_3^{\delta1+\delta2+\delta3}$
    $\delta^4 O_3$
    →Connected to $O_{31}$ (creator LOC, type=linked by the context of $O_3$)
    ⇒return to parent agent ($\delta^4 O_3^{\delta1+\delta2+\delta3}$, $O_{31}$)

Specifically, to implement this context precision rule, the agent LOC uses the know-how 1 for detecting the design branch contour as per a criterion describing the context of the object $O_3$ in the domain $DM_{fus-acq}$ and organized in the form of a design tree of the domain $DM_{fus-acq}$. The object in question is an "acquisition of companies with falling shares" zone. This zone gives rise to the creation of the object $O_{31}$ which is of the mark point type and form of the zone type in the design tree. The object $O_{31}$ is secondly connected to $O_3$ by the context of $O_3$ and to $O_{30}$ which describes the context of $O_3$ in the domain $DM_{Asia}$. The link between $O_3$ and $O_{30}$ is virtual in the agent LOC. Then the latter updates $O_3^{\delta1+\delta2+\delta3}$ which makes it possible to obtain $\delta^4 O_3$ which is connected to $O_3$ by a link of the type linked by context of $O_3$. Then the agent LOC sends $\delta^4 O_3^{\delta1+\delta2+\delta3}$ and $O_{31}$ to the parent agent, namely the agent $A_{fus-acq}$.

The plan rule of the agent $A_{mer-acq}$ brings the latter after the return of the request sent to the agent LOC to send a request 2 to the agent VAL for the latter to look for a correlation between the objects $O_{31}$ and $O_3$ provided this must involve rival companies concerning the same type of product. This therefore concerns a selection of a contour under a particular criterion. The constraint of rival companies, as commanded by VAL, comes from the fact the index $O_3$ has been detected by political economy watching agents. It is therefore necessary to study the elements of this index which are connected with the rivals. The contour that is obtained brings the agent VAL to create the object $O_{33}$ of the control point type. $O_{33}$ is contained in $O_3$ and in $O_{31}$. The agent VAL thus creates the following updatings:
  $\delta^5 O_3$
    →Connected to $O_{33}$ (creator VAL, type=contains)
  $\delta^1 O_{31}$
    →Connected to $O_{33}$ (creator VAL, type=contains)

The agent still looks to see if there is a common characteristic between the companies of the zone $O_{33}$. In the present example, it proves that these companies have in common their mode of acquisition which is of the type OPA, namely "public purchase offer". This brings as an additional element $\delta^1 O_{33}$ which becomes of the recognized object type, of rival use OPA and has the property of being strategic. The agent VAL then sends the analyzer agent $A_{mer-acq}$ the objects $\delta^5 O_3^{\delta1+\delta2+\delta3+\delta4}$, $\delta^1 O_{31}$ and $O_{33}^{\delta1}$. The agent $A_{mer-acq}$ updates the elements and sends the tracking agent $P_{fus-acq}$ the objects $O_1^{\delta1\ to\ \delta5}$, $O_{31}^{\delta1}$ and $O_{33}^{\delta1}$. These objects are then sent to the channel agent $C_{inv}$ which transmits all of them with the objects $O_1^{\delta1}$ to $\delta5$, $O_{20}^{\delta1}$ and $O_2^{\delta1}$ originating from the tracking agent $P_{cycle\ inv}$ to the agent $UM_{fin}$ which in turn transmits them to the master agent GM. FIG. 4 illustrates for the invariant 2 the creation, construction and movement of the knowledge objects and the objects stored in the various storage devices DST of the various agents constituting the network of the invention.

The agent GM thus has available the results of the two invariant procedures 1 and 2 which have been automatically established by a network of agents each functioning according to the specific action plan, strategy and aim rules in accordance with an overall aim to be reached and able to be modified by man. In the present case, the object $O_2$ is correlated with the index $O_1$. These are the two objects which have the property of having deviations in the investment and accounting management reports in relation to the product PA. These two observations thus furnish a visibility to the financial user of the type of financial problems that are systematically generated by the product A. Secondly, the knowledge object $O_{33}$ proves to be a strategic element enabling the agent GM to evaluate the incident formed by the object $O_3$ which has triggered the validation process which has just been described. This strategic characteristic could be reused subsequently by the system or by the user. Depending on this evaluation, the collective knowledge manager CKM can take appropriate decisions, particularly those to use his Marketing and Technical agents for a further study of the analysis of the problematics concerning $O_1$ and $O_2$, as well as the aim, strategy and plan rules. It is to be noted that the system of the invention ensures a control which may be permanent and be triggered upon the appearance of a small index by placing in correlation several points of different views, or several competencies.

By referring to FIGS. 7 to 14, the method stages according to the invention will be described below, intended to further the study in depth concerning objects $O_1$ and $O_3$. For this purpose the GM agent requires implementation of supplementary invariants, namely an invariant 3 launched concomitantly with launching invariant 2 on another agent user, comprising an examination stage 1 with the purpose of searching out important events, called accidents, that could concern the $O_1$ and $O_3$ objects, an invariant 4 comprising an examination stage 2 during which merges/connections are attempted between control points established in the scope of invariant 2 and accidents recognized during invariant 3, this leads to the establishment of presumptions in the reasoning, and lastly an invariant 5 comprising a third examination stage including a technical analysis of presumptions documented previously and a man-machine dialog in order to reach a machine decision made collectively among different user agents.

Invariant 3: Search for Accidents

In a general form, during implementation of invariant 3, at each level n of the agents' pyramid will be verified whether level n–1 has already been created possibly during the invariant 1 and 2. If the answer is negative, the parent agent of level n creates child agents of level n–1, where there is a need to realize the aim conferred upon it. These possible structuring phases of services and data are executed by applying aim and strategy rules corresponding to those already described. It should be noted that at the time of implementing each aim and strategy rule the modes and parameters are specified which have already been determined. The retrieval of this information allows the system to be able, at any time and any site of the agent structure, to accomplish its task according to what has already been executed. It is specified that the invariants 3, 4 and 5, like invariant 2, relate to the elementary subscripted objects detected, as in example $O_1$ and $O_3$.

More specifically, the GM agent, within the scope of the budgetary follow up and restructuring aim and under the condition of fast speed and low cost for the fast selection return of $O_1^{\delta^1+\delta^2+\delta^3}$ by $U_{fin}$ according to detection strategy 1 for indices and concomitantly with validation strategy 2 to find control points in $U_{fin}$, applies strategy 3 to agents $U_{tech}$ and $U_{mark}$ from examination 1 on the object $O_1$ matched by its knowledge elements of $O_1^{\delta^1+\delta^2+\delta^3}$, as received by agent $U_{fin}$.

It should be noted that following the first invariant, which has demonstrated a problem on product A concerning the budgetary follow up, the overall aim has evolved and has been specified as "budgetary follow up and restructuring," a strategic decision for marketing restructuring can be made for product A.

According to the strategy rule

If strat=strat 3 and if service is associated with agent=$U_{fin}$, $U_{mark}$, $U_{tech}$=service 1, if structure associated with agent is DH=k(n), ⇒search for k structure (n–1) associated with DH and with service 1

⇒if search result=$DM_{fin}$, $DM_{mark}$, $DM_{tech}$, and if conditions 1=fast and low cost, send:

aim 1 ($O_1$)=RECO 1 ($O_1$, $DM_{tech}$, ... ) to $U_{tech}$ aim 1 ($O_1$)=RECO 1 ($O_1$, $DM_{mark}$ ... ) to $U_{mark}$.

The GM agent must then address its two child agents $U_{tech}$ and $U_{mark}$. First of all will be described by referring to FIG. 7 how $U_{tech}$ accomplishes its mission.

$U_{tech}$, according to the aim rule of aim 1=RECO 1, should implement the strategy=strat 3 concerning the object $O_1^{\delta^1+\delta^2+\delta^3}$ in the $DM_{tech}$ knowledge field. Strategy 3 is broken down in the manner already described previously, into three strategy phases strat 3.0, strat 3.1 and strat 3.2, during the course of which agent $U_{tech}$ after addressing itself to the structuring agent of the COTS service receives the order to create "PROJECT-MANAGEMENT" and "OLD-TECHNOLOGY" Channel agents, hereinafter called $C_{proj\text{-}man}$ and $C_{old\text{-}tech}$. The strat 3.1 strategy handles the dispatch to the $U_{tech}$ agent on behalf of the structuring agent of $COTS_D$ data services of the $DM_{proj\text{-}man}$ and $DM_{old\text{-}tech}$ tech data which are extracted from $DM_{tech}$. According to the rule if strat=strat 3.2, $U_{tech}$ sends the message aim 1=strat 3.2=RECO 1 by Channel to its child agent $C_{proj\text{-}man}$. The $U_{tech}$ agent requests RECO 1 about $O_1$ more specifically to agent $C_{proj\text{-}man}$ because, during the search in the accounting domain, $DM_{com}$, does not permit obtaining forecasts on a product, it must verify whether there is a problem in the project management of development programs. Further, $U_{tech}$ requests RECO 1 only through its child $C_{proj\text{-}man}$, because the system is working under conditions of fast and low cost.

The $C_{proj\text{-}man}$ Channel agent as a function of aim 1=RECO 1 per Channel on $O_1^{\delta^1+\delta^2+\delta^3}$ in application of strategy 3, again including strategy phases strat 3.0, strat 3.1 and strat 3.2, create tracking agents of $P_{plan\text{-}dev}$ and $P_{RH}$ tracking strat 3.0, receives according to strategy strat 3.1 the $DM_{plan\text{-}dev}$ and $DM_{RH}$ data packages, plan-dev means "Development Plan" and RH means "Human Resources." The services and data structure which have been constructed are stored in memory M.

Then, in application of the strategy rule, if strat=strat 3.2, if the overall aim is budgetary follow up and restructuring, if the condition is "fast and low cost," if the $O_1$ form is extracted from $DM_{CR}$, if the $O_1$ property=T.B. (console) deviation, the $C_{proj\text{-}man}$ Channel agent sends the message aim 1=strat 3.2=RECO 1 for tracking to the $P_{plan\text{-}dev}$ agent, for the reason which has been given above at the time of stating the rule of strategy 3.2 of the $U_{tech}$ agent which justified the execution of strategy 3.2=RECO 1 per channel, by the $C_{proj\text{-}man}$ agent. It should be noted that, under the conditions determined by the decisional process as has been done until now and the results obtained, the $P_{plan\text{-}dev}$ agent has the task of creating an $A_{plan\text{-}dev}$ analyzer agent.

This latter agent has a aim rule to implement plan 3 for searching for accidents in the numerical structure of the $DM_{plan\text{-}dev}$ data of the RECO 1 stage which consists in creating three cognitive agents, namely a focusing agent FOC which is a detector of weak numerical signals, a localization agent LOC for detection of context and form of control points and a SCAN agent which is a fine analyzer of features, the functions of which appear below.

The plan rule causes the $A_{plan-dev}$ analysis agent to make request 1 to the LOC agent to specify in conjunction with the FOC agent the context of $O_1^{\delta 1+\delta 2+\delta 3}$ in the $DM_{plan-dev}$ domain and, after return of request 1, to make a request 2 to the agent SCAN requesting that the latter give specifications on the new $O_1$ elements and the new knowledge objects created by the agent LOC.

More specifically, the agent LOC during invariant 3 must specify the context of $O_1$, in the $DM_{plan-dev}$ data structure according to the following rules:

if aim=specify the context of $O_1^{\delta 1+\delta 2+\delta 3}$ (plan 3, overall aim, $DM_{plan-dev}$), if context of $O_1$=product A, if $O_1$ linked to $O_7$ of type linked by the context,
⇒use know-how 1=detect branch given by the context in $DM_{plan-dev}$, applied to product A;
⇒create $O_6$ (data branch):
→Id
→Type (context)
→LOC Creator ($A_{plan-dev}$)
→Form (type=zone, creator LOC, $DM_{plan-dev}$ structure, index, form=branch data, medium=BD)
→Connected to ($O_1^{\delta 1+\delta 2+\delta 3}$ creator LOC, type=linked by context, $O_7$: creator LOC, type=describing the context object)
→Usage (development plan product A)
⇒Update $O_1^{\delta 1+\delta 2+\delta 3}$:
$\Delta^1 O_1^{\delta 1+\delta 2+\delta 3}$
→Connected to ($O_6$: creator LOC, type=connected by context)
⇒Execute "obtain form—control point ($O_6$, $DM_{PLAN-DEV}$)" by FOC
⇒if return of FOC=($\Delta^1 O_6$, $O_8$), update $O_6$ in LOC ($\Delta^1 O_6$)
⇒execute return to parent of ($\Delta^1 O_1^{\delta 1+\delta 2+\delta 3} O_6^{\Delta 1}$, $O_8$)

The FOC agent is programmed to act according to the following aim rule to perform the numerical signal detection:

if aim=obtain form of control point ($O_6$, $DM_{plan-dev}$) received from LOC, if $DM_{plan-dev}$=numerical structure:
⇒use know-how 1=calculate "TB" console signals of O6 in $DM_{plan-dev}$
⇒use know-how 2=detect TB signals
⇒if amplitude calculated signals>threshold 1, if surface signals<threshold 2, create $O_8$ as:
$O_8$
→ID
→Type (control point form
→Creator FOC ($A_{plan-dev}$)
→Form (type=skeleton, creator, FOC, $DM_{plan-dev}$ structure, index, form=numerical value $\Delta R$, media=numerical values sources)
→Property (TB "console" dev.)
→Connected to ($O_6$: creator FOC, type=contained in)
→Use (plan dev product A)
⇒update $O_6$:
$\Delta^1 O_6$
→Connected to ($O_6$; FOC creator, type, =context)
⇒execute return to LOC of ($\Delta^1 O_6$, $O_8$)

The analysis agent $A_{plan-dev}$, after the receipt of objects $\Delta^1 O_1^{\delta 1+\delta 2+\delta 3}$, $O_6^{\Delta 1}$, $O_8$ originating from LOC agent, sends request 2 to the cognitive agent SCAN asking this agent to provide specifications on these objects.

The agent SCAN implements the following rules:

if aim=specify ($O_1^{\delta 1+\delta 2+\delta 3+\Delta 1}$) where data are $O_6^{\Delta 1}$, $O_8$, in $DM_{plan-dev}$, if no control point $O_8$ exists, if property $O_8$=TB "console" dev, if form $O_8$ extracted from $DM_{plan-dev}$, if aim=budgetary follow up and restructuring, if property of O1=TB dev in $DM_{CR}$
⇒use know-how 1=detection of a common or exceptional cognitive characteristic in the $O_8$ object in $DM_{plan-dev}$
⇒if there exists such a characteristic, create, $O_9$
→ID
→Type (marker control points)
→Creator SCAN ($A_{plan-dev}$)
→Form (type column, creator SCAN, $DM_{plan-dev}$ structure, index, form, =common characteristic, media=BD "branch data" table)
→Connected to (O8: creator SCAN, type=contained in)
→Usage (technology, name=$X_1$)
→Property (risk)
⇒If Usage ($O_9$)=technology, execute update
$\Delta^1 O_8$
→Type (form control point→control point)
→Connected to $O_9$: creator SCAN, type, contains)
⇒execute return to parent agent ($\Delta^1 O_8$, $O_9$)

Concerning the search for a cognitive characteristic the SCAN agent can detect either accidents, or marker points. For example, if the index is a deviation in the accounting results domain, if the control point is a deviation in the development of a product, SCAN searches to see whether a common technology exists in the control point parameters. If yes, it is a marker point.

It is evident from the foregoing that in the case in point no accident has been found. In this situation where the $C_{proj-man}$ agent documents that there is no accident on return, it directs to its sibling agent $C_{old-tech}$ a specification request for examination 1.

According to the aim rule, if aim=specify RECO 1 on $O_1^{\delta 1+\delta 2+\delta 3}$, where $O_6^{\Delta 1}$, $O_8^{\Delta 1}$, $O_9$ is given, sent by $C_{proj-man}$, the $C_{old-tech}$ agent must apply strategy 3, breaking it down into three strategies 3.0, 3.1 and 3.2 so as, according to the strategy 3.0, to create tracking agents $P_{conc}$, where $P_{conc}$ signifies an agent tracking "COMPETITORS" and $P_{press}$, according to strategy 3.1, to assure that the tracking agent is provided with $DM_{conc}$ and $DM_{press}$ data extracted from $DM_{old-tech}$ and, according to the strategy 3.2, send the request to specify RECO 1 by tracking the $P_{conc}$ agent. Effectively, the $C_{old-tech}$ channel agent in fast strategy chooses to send the aim to specify RECO 1 by tracking with the tracking agent which monitors competitors in relation to critical technology. The $DM_{conc}$ structure is an alphanumeric data chart.

The tracking agent $P_{conc}$ according to the aim rule "if aim=specify RECO 1 by tracking on $O_1^{\Delta 1+\Delta 2+\delta 1+\delta 2+\delta 3}$ with $O_6^{\Delta 1}$, $O_8^{\Delta 1}$, $O_9$, apply strat=strat 3," choose an analyzer agent, namely the $A_{conc}$ agent and send the aim=search–specify accident for this $A_{conc}$ agent.

The $A_{conc}$ agent creates in the chosen example of the invention a cognitive agent, namely a SCAN agent, the function of which is adapted to perform the monitoring of a structure on criteria (type 2 SCAN function).

The SCAN agent acts according to the rule:
if aim=specify RECO 1 on $O_1^{\Delta 1+\Delta 2+\delta 1+\delta 2+\delta 3}$ with $O_6^{\Delta 1}$, $O_8^{\Delta 1}$, $O_9$, if property of $O_1$=TB "console" deviation in $DM_{CR}$, if a control point $O_8$ exists as $O_8$ property=TB "console" deviation and usage $O_8$=investment product A, if there exists a marker point $O_9$, such as usage $O_9$=technology,
if $DM=DM_{conc}$, if overall aim=budgetary follow up and restructuring,
⇒use know-how 2=detection of an exceptional characteristic in the $DM_{conc}$ structure according to the usage of $O_9$ and ⇒if the result is positive, create $O_{10}$
  →ID
  →Type (accident)
  →Creator (SCAN $A_{conc}$)
  →Form (type axis, creator SCAN, $DM_{Conc}$ structure, index, form induced=vectors; media=alphanumeric BD "branch date")
  →Connected to ($O_9$: SCAN creator, type=possesses)
  →Usage (new entry)
  →Property (strategic)
⇒execute update:
$\Delta^1 O_9$
  →Connected to ($O_{10}$: creator SCAN, type=possessed by)
⇒execute return to parent of ($\Delta^1 O_9, O_{10}$)

Stated otherwise, for the execution of its task, the SCAN agent knows that it should examine all competitors of the $DM_{conc}$ tree which possess the marker point, that is, the critical technology, and detect whether there are new competitors. In the affirmative case, it creates an object, namely object $O_{10}$, which represents a new entry. However, a new entry, by definition, constitutes an accident. It should be noted that all objects concerning the new entries are qualified as strategic.

The $DM_{conc}$ domain can be structured in the form of a table. In this table the different competitors occupy a line in which all the available information is indicated, such as the technological ones, $X_1$ to $X_n$, used by the competitor, its entry date, patents it possesses, its capital etc. By examining this chart, the SCAN agent notes a competitor has a recent entry date and it uses the X1 technology constituting the $O_9$ object. This competitor becomes the above-mentioned object $O_{10}$. The fact that the documented new entry competitor uses the X1 technology gives rise to the creation of knowledge element $\Delta^1 O_9$ with the field "connected to $O_{10}$."

According to the return rules, the $A_{conc}$ agent, under conditions that there is an object, namely $O_{10}$ which is linked to $O_1$ and has the property of strategic and where $O_{10}$ constitutes an accident, create $\Delta^3 O_1^{\Delta^{1+}\Delta^{2}+\delta 1+\delta 2+\delta 3}$, such as
$\Delta^3 O_1^{\Delta^{1+}\Delta^{2}+\delta 1+\delta 2+\delta 3}$
  →interest: 2 (1) (contains a strategic object)
  →alarm: 2 (1) (contains an accident)

In this representation the number indicated in brackets gives the number of strategic objects and accidents, respectively, from the interest and alarm fields. The object is of interest and alarm level 2 since it contains a strategic object and an accident.

Figure 7:
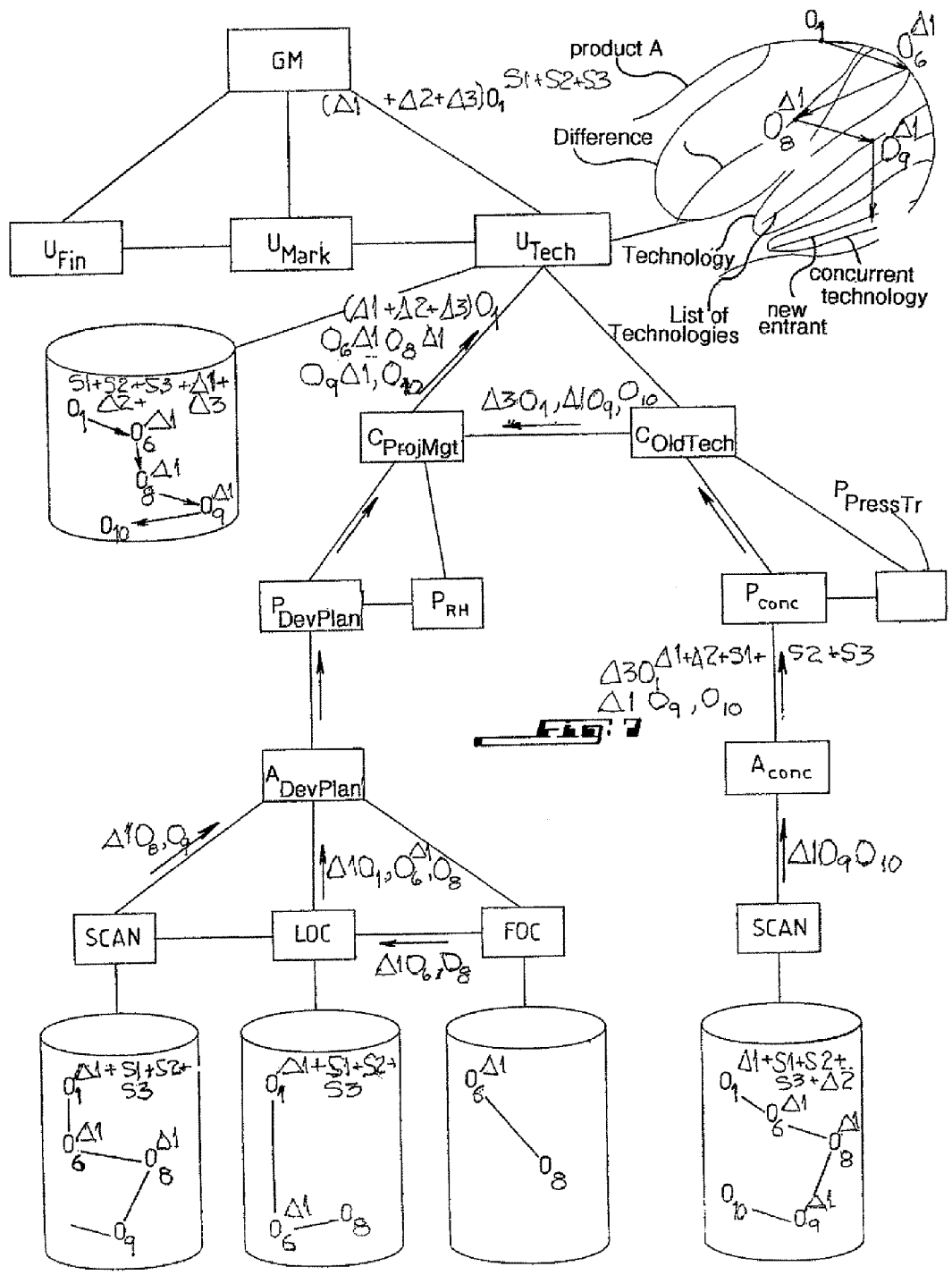
FIGS. 7 and 8 illustrate schematically the implementation of invariant 3 in the search for accidents by agents $U_{tech}$ and $U_{mark}$ respectively.

As FIG. 7 shows, in response to the request "specify RECO 1" originating from the agent $C_{proj-man}$, the agent $C_{old-tech}$ sends the objects it has created to the latter and it sends back the knowledge elements and knowledge objects ($\Delta^1 + \Delta^2 + \Delta^3$) $O_1^{\delta^{1+}\delta 2+\delta 3}, O_6^{\Delta^1}, O_8^{\Delta^1}, O_9^{\Delta^1}$ and $O_{10}$ to the agent $U_{tech}$.

Results obtained at the end of the examination 1 on object $O_1$ are structured in the IKM formed by the agent $U_{tech}$ so as to permit a clearly legible screen representation of the man-machine interface.

FIG. 7 shows an advantageous representation of these results in the form of a structured knowledge tree, organized by knowledge class. A structured knowledge tree constructed from the index corresponds to each index object detected and analyzed. On FIG. 7 an external line forming an envelope represents the context of the index $O_1$, namely product A. The space delimited by this line is divided into a numbers of zones in the shape of lobes, each assigned to a knowledge class. Lines inside a lobe class designate sub-classes. Each of the domains, deviations, mergers—acquisitions, competitors and technologies, constitutes a class. Domains are chosen because they correspond to structuring knowledge classes with respect to the decisional process for the realization of an overall aim. The deviation class has as its sub-class the domain of deviations on accounting results, investments and development plans. The OPA domain constitutes a sub-class of the merger and acquisitions class. The new entries are a sub-class of the competitor class and the list of technologies and list of patents each constitute a sub-class of the technology class.

Results which have been obtained at the time of examination 1 are placed on the screen display shown in FIG. 7 according to their allocation to classes and sub-classes as has been defined. The placement of objects is made based upon the contents of their "property" and "usage" fields. The agent reads fields in order of priority. First it reads the field type. If an object is context type it is placed on the envelope of the knowledge tree. Then the agent reads the "property" fields of objects, and if the field content is structuring it creates the corresponding class, if this does not already exist, and places the object. Then it reads the usage fields. If this field is structuring and it corresponds to a sub-class with the structuring property, the agent places the object therein. If the field property is not structuring) it reads the "usage" field. If this field is structuring, the agent creates the class, if it does not already exist, and places the object.

In this case, involving object $O_1$, it is the "deviation" property which is structuring. Therefore object $O_1$ is placed on the line representing the envelope of product A, context of $O_1$. Concerning object $O_6$, the agent notes that $O_6$ is the context type and the agent places object $O_6$ on the envelope line, between two classes since neither the $O_6$ field property nor the $O_6$ usage property are structuring. Object $O_8$ with the property of "deviation" and its usage is "plan-development," is placed in the "deviation" structuring class and is also arranged on the line of sub-class "plan-development deviation." Object $O_9$ has the "risks" property which is non-structuring and since its usage is "$X_1$ technology," it has its place on the line of the sub-class "technology lists" inside the technology class. Lastly the $O_{10}$ object where its strategic "property" is not structuring and its usage is "new entry," is placed on the "new entry" sub-class line of the competitor class. Then links are established to these objects based on their "connected to" field. Therefore, $O_1$ is joined by an arrow to $O_6$, $O_6$ to $O_8$, $O_8$ to $O_9$ and $O_9$ to $O_{10}$. In order to make it appear clearly that the object $O_{10}$ is the accident type, it is highlighted by pointing to it with a thick arrow. Since the object $O_8$ is the control point type, it is also associated with a thick arrow. The arrow lines that connect the different objects constitute the decisional path or the scheme that has been tracked during the recognition stage 1 on object $O_1$.

Figure 8:
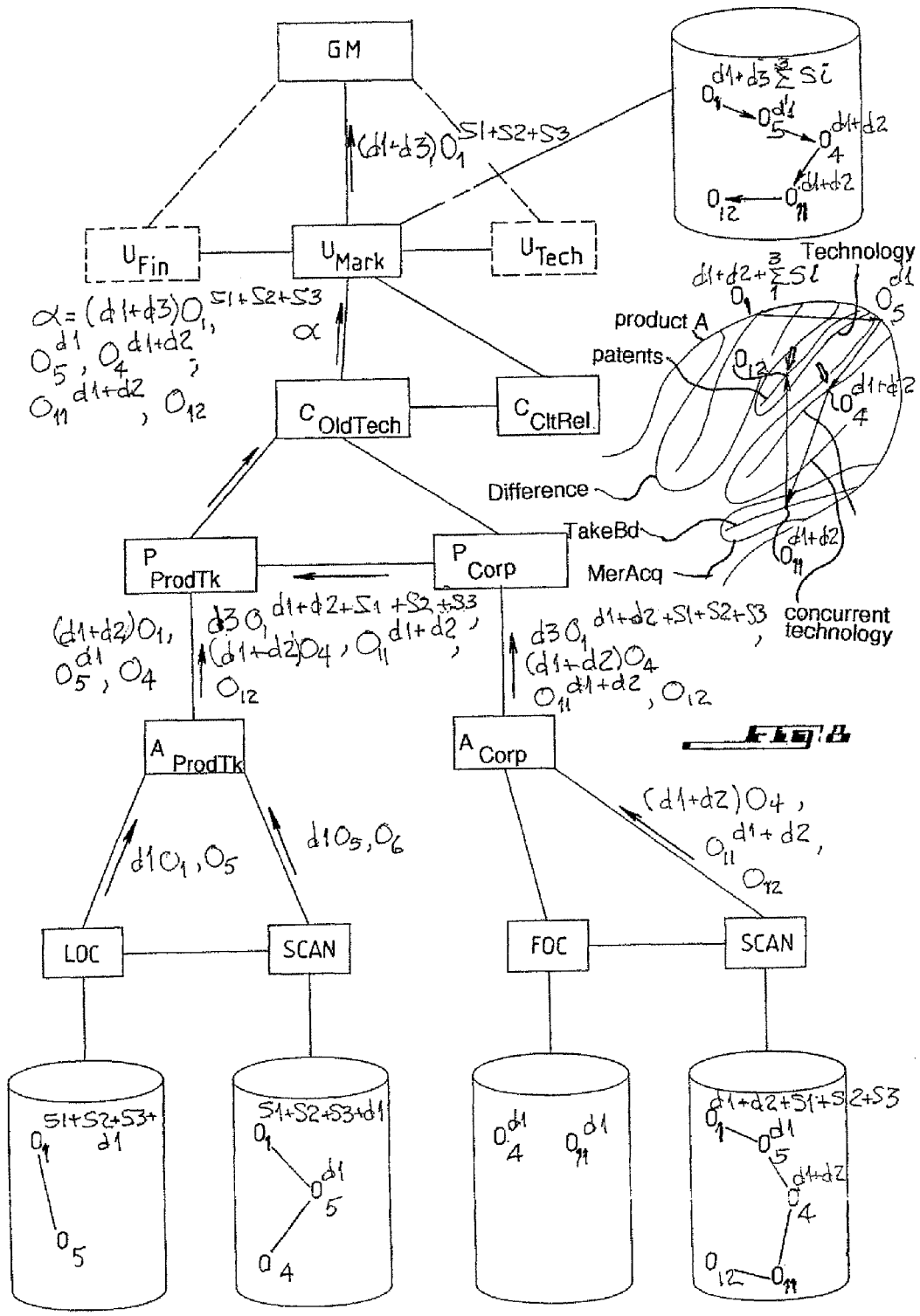
Figure 40:
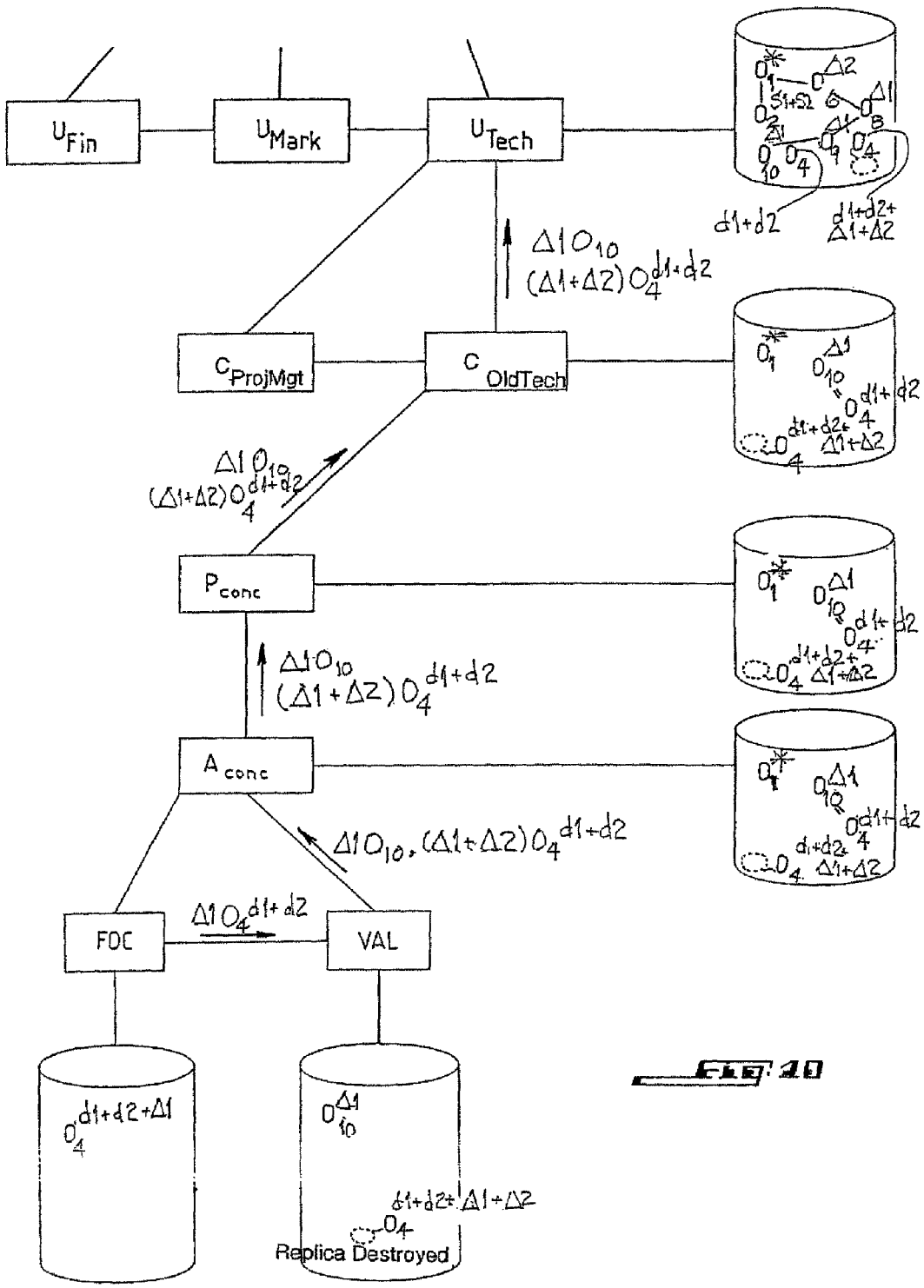

How $U_{mark}$ executes its examination 1 mission will be described below with reference to FIG. 8.

Effectively pursuant to the GM agent's strategy rule it has also sent, an examination request on $O_1$ to the $UM_{mark}$ agent.

Figure 6:
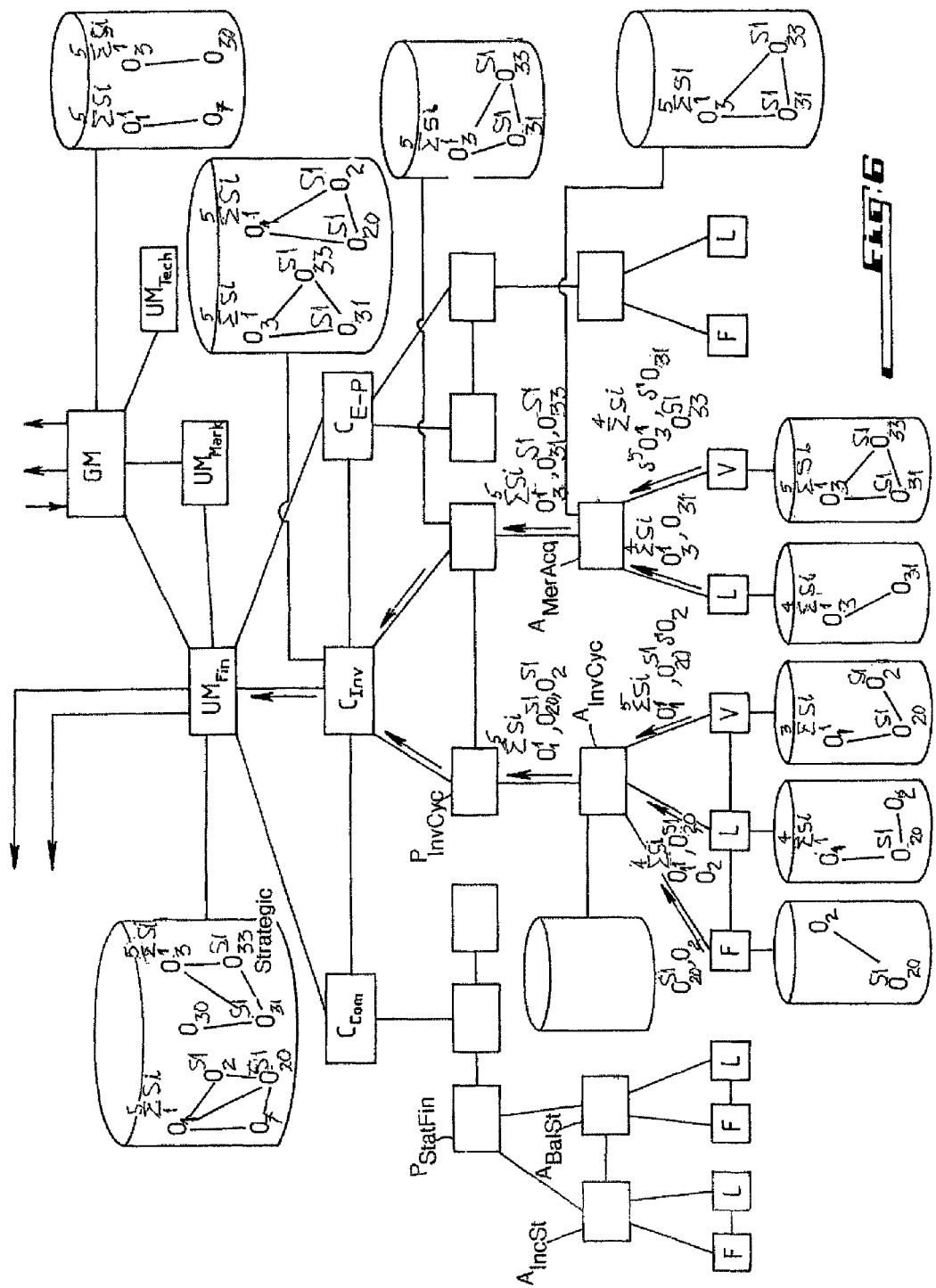

As is noted by referring to FIG. 6, this agent has not yet been structured. This therefore must be conditioned so as to be able to perform the RECO 1 examination procedure on the object $O_1$.

Given the structure establishment which the $U_{mark}$ agent must arrange, with the structuring of services and the assignment of knowledge packages with the aid of $COTS_S$ and $COTS_D$ structuring agents, it is done according to the aim and strategy rules at each level of the pyramid, as has been previously described in detail with regard to the establishment of the $U_{tech}$ agent structure, it is sufficient now to indicate that the $U_{mark}$ agent will have as a channel agent an "Old-Marketing" agent $C_{Old-Mark}$, and an "Customer Relations Management" agent CORE. The last agent channel is not used however for the examination by $U_{mark}$ on object $O_1$, considering Condition 1, fast and low cost. The $C_{Old-Mark}$ channel agent is assigned a "Products," tracking agent $P_{prod}$ and a "Companies" tracking agent $P_{SOC}$.

The $A_{prod}$ analysis agent given to the $P_{prod}$ agent will arrange two cognitive agents, namely a LOC type agent and a SCAN type agent. The analyzer agent $A_{SOC}$ and tracking agent $P_{SOC}$ will have an FOC type agent and a SCAN type agent, the LOC, FOC and SCAN agents are gradually constructed as the decisional process progresses.

Regarding the data sent by the $COTS_D$ data structuring agent, the $C_{Old-Mark}$ agent receives the $DM_{old-Mark}$ data. $P_{prod}$ and $P_{SOC}$ tracking agents have available the $DM_{prod}$ and $DM_{SOC}$ data.

The $A_{prod}$ agent should, after constructing the FOC and SCAN agents according to an aim rule, look for accidents during examination 1 on object $O_1^{\delta 1+\delta 2+\delta 3}$ in the $DM_{prod}$ data domain, makes the request to the LOC agent to specify the context of $O_1^{\delta 1+\delta 2+\delta 3}$ in $DM_{prod}$ which might be structured in the form of an alphanumeric data table. Thus, the table gives the list of all products marketed by the company for which the budgetary follow up is done and competitors' products. For each product the Companies are indicated, in the specified columns, which produce the product in question, their entry dates into the market, the technologies used, patents relating thereto etc.

It should be noted that all analysis agents act according to aim rules which implement action plans, chosen by the analysis agent according to parameters that it receives from its parent.

Since the $DM_{prod}$ structure is alphanumeric, the LOC agent is a simple context detector which functions according to the following request rules:

If aim=specify simple context of $O_1^{\delta 1+\delta 2+\delta 3}$ in $DM_{prod}$, if $O_1$ context=product A, if $O_1$ is linked to $O_7$ of the type linked by the context,
⇒use know-how 3=detection branch by context of the index in $DM_{prod}$ and apply it to product A
⇒create $O_5$ (branch data) such as
→ID
→Type (context)
→Local creator ($A_{prod}$)
→Form (type=zone, creator LOC, $DM_{prod}$ structure, index, form=branch data, media=BD alphanumeric)
→Connected to ($O_1$: LOC creator, type=connected by the context,
$O_7$: LOC creator of $A_{CR}$, type=describing the linked object)
Usage (competitor on product A)
⇒Update: $d_1\ O_1^{\delta 1+\delta 2+\delta 3}$
Connected to ($O_5$: LOC creator, type=connected by context)
⇒execute return to parent of ($d^1\ O_1^{\delta 1+\delta 2+\delta 3}$, $O_5$)

By applying these rules, LOC found a set of competitors for product A, which becomes object $O_5$. $O_5$ and $d^1 O_1^{\delta 1+\delta 2+\delta 3}$ then return to the $A_{prod}$ agent.

The $A_{prod}$ agent after receiving such results from its LOC agent should perform a "fine analysis" type operation of an object through its SCAN agent. The SCAN agent acts according to the following rules;

If aim=specifies ($O_1^{d1+\delta 1+\delta 2+\delta 3}$), since $O_5$ is given, if no form of control point exist, if $O_5$ exists of context type, if property $O_1$=deviation TB in $DM_{CR}$, if context $O_1$=product A, if overall aim=budgetary follow up and restructuring
⇒use know-how 1=detection of a common knowledge or exceptional characteristic in the object $O_5$, in $DM_{prod}$,
⇒if there exists an exceptional characteristic, then create:
$O_4$
→ID
→Type (accident)
→Creator SCAN ($A_{prod}$)
→Form (type=point, creator SCAN, $DM_{prod}$ structure, index, form=point characteristic, media=alphanumeric BD "branch data")
→Connected to ($O_5$: creator SCAN, type contained in)
→Usage (new entry, name=Y)
→Property (strategic)
⇒execute update
$d^1 O_5$
→Connected to ($O_4$: creator SCAN, type=containing)
⇒execute return to parent ($d^1 O_5$, $O_4$)

In other terms, in order to execute its mission defined above, SCAN will scan $O_5$, which means entry in the table representing the list of competitors on product A. It is known that, in the $DM_{prod}$ data, a new entry is considered as constituting an exceptional characteristic. More specifically, it will therefore scan the "entry date" column of each competitor company producing product A. SCAN detects a new entry which constitutes the $O_4$ object. The objects indicated in the return rule are sent to the $P_{prod}$ agent.

The $P_{prod}$ tracking agent by reason of the strategic objects which it received from the $A_{prod}$ agent must address itself to its sibling, namely the $P_{SOC}$ agent, so that this may execute through its SCAN agent a function of the type 3=fine exploration of an object by iteration in the same class, in order to specify objects received. The SCAN agent is going to apply the following rules:

If aim=specify $O_1^{d1+d2+\delta 1+\delta 2+\delta 3}$, where $O_5^{d1}$, $O_4$, is given 0 if the "specify" function is type 3 if $O_4$ type accident,
⇒execute request to FOC=to retrieve $O_4$ in $DM_{SOC}$
⇒if return of request=$d^1 O_4$, update $d^1 O_4$ and used know-how 1=detection of exceptional characteristic in the $O_4^{d1}$ object in $DM_{SOC}$
⇒if positive result in the column "takeover" ($O_4^{d1}$), create $O_{11}$
→ID
→Type (marker-accident)
→Creator (SCAN($A_{SOC}$))
→Form (type=point, creator SCAN, structure, $DM_{SOC}$, index, form=point characteristic, media=axis of BD)
→Connected to ($O_4^{d1}$: creator SCAN, type=contained in)
→Usage (OPA Japanese company, name=Z)
→Property (strategic)
⇒execute update
$d^2 O_4^{d1}$
→Connected to ($O_4$: creator SCAN, type=contains)
⇒if result of know-how 1=($O_{11}$, $d^2 O_4^{d1}$), if $O_{11}$ property=strategic, if usage of $O_{11}$=OPA company, if structure=$DM_{SOC}$, continue iteration and make request to FOC=retrieve $O_{11}$ in $DM_{SOC}$
⇒if return request=$d^1 O_{11}$, execute update $d^1 O_{11}$ and use know-how 1 for detection of exceptional characteristic on $O_{11}^{d1}$ in $DM_{SOC}$
⇒if positive result in the "patent" column, create $O_{12}$
→ID
→Type (accident)
→Creator (SCAN ($A_{SOC}$))
→Form (type=point, creator SCAN, structure, $DM_{SOC}$, index, form=point characteristic, media=BD axis alphanumeric)

→Connected to ($O_{11}^{d1}$: creator SCAN, type=contained in)
→Usage (patent competitor, name=B)
→Property (risk)
⇒execute edit
$d^2O_{11}^{d1}$
→connected to ($O_{12}$: creator SCAN, type=contains)>
⇒If Usage ($O_{12}$)=patent and if structure=$DM_{SOC}$, halt iteration,
⇒execute return to parent of (($d^1+d^2$)$O_4$ $O_{11}^{d1+d2}$, $O_{12}$)

In application of these rules, the SCAN agent makes a request to FOC to retrieve $O_4$ in the $DM_{SOC}$ domain because it knows that $O_4$ concerns a company. Therefore $DM_{SOC}$ must contain information on this company.

The FOC agent is programmed to commence with a search by name. If the name does not exist in the $O_4$ usage field, a search by form should be made. FOC then looks for all available information, such as entry date and the fact that this company markets product A. FOC writes the information in a fresh line of a table, representing the $DM_{SOC}$ data structure. This chart presents companies line by line, with each line containing all the available information on this company. Then by performing the scalar product, that means by comparing the information term by term of the line just written by the agent to the information already contained in the lines of listed Companies, the company sought proves to be the company where at least a great deal of the information corresponds to what appears in the written line.

Thus, the $O_4$ company which represents a point in the $DM_{prod}$ knowledge structure becomes the axis type in $DM_{SOC}$. Effectively, $O_4$ appears in the $DM_{SOC}$ table in the form of a line. Knowing that $O_4$ is a line in the $DM_{SOC}$ chart, on the first iteration the SCAN agent scanning this line may find other information and thus learn about subsidiaries of $O_4$. It turns out that one of subsidiaries is a Japanese company which has just been bought by OPA. This fact results in the creation of the $O_{11}$ object indicated above, of the accident marker point type, form point type and usage "OPA of Japan." It concerns a company Z.

Then, in a second iteration, the SCAN agent addresses itself to the FOC agent and asks it to identify $O_{11}$, i.e., company Z in the $DM_{SOC}$ structure. The FOC agent finds the corresponding axis which constitutes the knowledge element $d_1O_{11}$ which becomes an axis type and is sent back to SCAN so that this agent looks at information written in the Z axis and finds a new patent in the patent column concerning product A. This discovery gives rise to the creation of object $O_{12}$, which has been indicated above and is the accident type, of the form point and usage "competitor patent." Indeed, due to the discovery of a competitor's patent concerning product A, object $O_{12}$ constitutes an important piece of information and is qualified to be the accident type. The SCAN agent stops its iterations because the object $O_{12}$ is no longer defined in the $DM_{SOC}$ structure.

The SCAN agent is sent back to $O_4$ which has changed, under the form ($d^1+d^2$)$O_4$ accompanied by $O_{11}^{d1+d2}$ and $O_{12}$, by the $A_{SOC}$ analyzer agent. The $O_1$ and $O_5$ objects have not changed and therefore are not sent back. Then the objects return back to the GM agent.

It is evident that the return of objects from the base to the head of the pyramid, constituted by the GM agent is done according to the pre-established rules, which have been given to each agent. The latter applies appropriate rules according to the nature and configuration of knowledge objects received.

Thus, the $A_{prod}$ agent of the $U_{mark}$ agent has already acted, by sending back objects created in its structure, to $P_{prod}$, according to the rules:

If aim=search accident of $O_1^{\delta 1+\delta 2+\delta 3}$, in $DM_{prod}$, if fine search=$d^1O_1^{\delta 1+\delta 2+\delta 3}, O_5^{d1}, O_4$, if $O_4$ exists linked to strategic property $O_1$ and is accident type,
⇒execute $d^2O_1^{d1+\delta 1+\delta 2+\delta 3}$,
→interest=2
→alarm=2
⇒execute return to parent (($d^1+d^2$) $O_1^{\delta 1+\delta 2+\delta 3}$, $O_5^{d1}$, $O_4$)

This update increments the interest and alarm fields by 1, which means that $O_1$ contains a strategic object and an accident. It involves a type 1, level 1 merge.

The $P_{prod}$ agent acts according to the following rule:
If aim=RECO1 ($O_1^{\delta 1+\delta 2+\delta 3}$), in $DM_{prod}$, if return aim= ($d^1+d^2$)$O_1^{\delta 1+\delta 2+\delta 3}, O_5^{d1}, O_4$,
if $O_4$ exists of type accident and property strategic, if usage $O_4$=new entry
⇒execute update for arrival of objects ($d^1+d^2$)$O_1^{\delta 1+\delta 2+\delta 3}$, $O_5^{d1}$, $O_4$
⇒if $P_{SOC}$ exists, send aim 1=specify-RECO1 ($O_1^{d1+d2+\delta 1+\delta 2+\delta 3}$)($O_5^{d1}$, $O_4$) by $P_{SOC}$.

It is this rule that has caused the $P_{prod}$ agent to address its sibling $P_{SOC}$ where its action has been described above. Indeed, if the $P_{prod}$ agent has documented that there is a strategic accident concerning a new entry, it must request a sibling to give it specifications on this accident.

The agent $A_{SOC}$, after the receipt of results that its cognitive agents have sent back to it in the scope of this mission, acts according to the following rule:

If aim=specifies-accident ($O_1^{d1+d2+\delta 1+\delta 2+\delta 3}$) ($O_5^{\delta 1}$, $O_4$) if end aim=($d^1+d^2$)$O_4$, $O_{11}^{d1+d2}$, $O_{12}$, if $O_{11}$ exists with property strategic, $O_{12}$ with property risk and type=accident, if $O_1$ interest=2 and $O_1$ alarm=2
⇒make $d^3O_1^{d1+d2+\delta 1+\delta 2+\delta 3}$
→Interest=2(2) (contains two strategic objects)
→Risk factor=1
→Alarm=2(2) (contains two accidents)
⇒execute update on the arrival of objects ($d^1+d^2$) $O_4$, $O_{11}^{d1+d2}$, $O_{12}$,
⇒execute return to parent of ($d^3O_1^{d1+d2+\delta 1+\delta 2+\delta 3}$,($d^1+d^2$)$O_4$); $O_{11}^{d1+d2}$, $O_{12}$)

These same objects are sent by $P_{SOC}$ to $P_{prod}$.

The agent $P_{prod}$ performs a merge of object elements that it receives from its sibling agent with those that are stored in its own structure.

If aim=RECO 1 per track ($O_1^{\delta 1+\delta 2+\delta 3}$) if return of aim sent to $P_{SOC}=(d^3O_1^{d1+d2+\delta 1+\delta 2+\delta 3}$, ($d^1+d^2$)$O_4$, $O_{11}^{d1+d2}$, $O_{12}$)
⇒Update on arrival of objects
⇒If $d^1$, $d^2$, $d^3$ are knowledge elements from return to parent, if $d^2$ and $d^3$ relate to common fields, if the more advanced changes of the common fields are in $d^3$, and if the different fields are also in $d^3$ then simply destroy $d^2$ and execute return to parent of (($d^1+d^3$)$O_1^{\delta 1+\delta 2+\delta 3}$, $O_5^{d1}$, $O_4^{d1+d2}$, $O_{11}^{d1+d2}$, $O_{12}$)

Effectively, $P_{prod}$ had received from its agent $A_{prod}$ objects ($d_1+d_2$) $O_1$, $O_5^{d1}$ and $O_4$, and it receives from its sibling $P_{SOC}$ the objects $d^3O_1$, ($d^1+d^2$) $O_4$, $O_{11}^{d1+d2}$ and $O_{12}$. Elements $d^2O_1$ and $d^3O_1$ are structured in the following manner:

$d^2O_1$
→interest=2(1)
→alarm=2(1)
$d^3O_1$
→interest=2(2)
→alarm=2(1)
→risk factor=1.

In this situation $d^3O_1$ takes precedence and $d^2O_1$, becomes outdated and can be deleted. There it involves a type 1, level 2 merge, that is, with contraction of the knowledge element before returning to the parent.

Therefore the $P_{prod}$ agent sends the object $(d^1+d^3)$ $O_1^{\delta^1+\delta^2+\delta^3}$ back to its $C_{Old-Mark}$ channel agent together with $O_5^{d1}$, $O_4^{d1+d2}$, $O_{11}^{d1+d2}$ and $O_{12}$. These objects are transmitted in this configuration to the $U_{mark}$ agent. This agent structures the result obtained during the RECO1 stage, inserts the objects received into its knowledge base by placing them in its knowledge landscape, structured by classes. The objects will be displayed on the screen in the manner shown in FIG. 8.

The structuring is performed in the manner already described above regarding the $U_{tech}$ agent. The agent first reads the object type. If it is the "index" or "context" type it places the object on the envelope of the knowledge landscape. Then it reads the object "property" fields. If the content of these fields is structuring it creates the corresponding class, if it does not already exist, and places the object therein. If the field is not structuring it reads the "usage" field. If this field is structuring the agent creates the class, if it does not already exist, and places the object therein. In this case, concerning the object $O_1$, it is the type index with property "deviation," which is structuring. Therefore the object $O_1$ is placed on the line of the envelope representing the $O_1$ context, that is, the product A and in the "Deviations" class. Concerning object $O_5$, the agent notes that its type is context and that the property field is empty. On the other hand, in the usage field is written "competitor for product A." This field is therefore structuring and the agent creates the competitor class and places object $O_5$ in the zone of this class, on the envelope line. Concerning the object $O_4$, it has the strategic property, that is, non-structuring and its usage "new entry," which is a sub-class of the competitor class. Therefore, $O_4$ will be placed on the new entry sub-class line inside the "competitor" class zone. Object $O_{11}$ is, according to its strategic property, which is not structuring and its usage is "OPA Japanese company." This usage is a sub-class of the class" Merger and Acquisitions (M & A), which causes the agent to create the M & A class and to place the $O_{11}$ object on the sub-class line inside the class zone, Lastly the $O_{12}$ object is the risk property and therefore non-structuring, but its "usage" field indicates that it involves a patent competitor. However, this usage is then a sub-class of the "technology" class which will be created by the $U_{mark}$ agent and the $O_{12}$ object will be placed on the line of sub-class "patent" inside the "technology" class.

In addition, the agent draws attention to the $O_4$ and $O_{12}$ objects by using short thick arrows since they are the "accident" type. Lastly, the agent illustrates by arrowed lines the path or decision scheme which permitted the creation of the indicated knowledge objects. This path also connects objects in the knowledge base of the agent.

After agents $U_{tech}$ and $U_{mark}$ have accomplished their work in view of the examination 1 aim on object $O_1$, only the knowledge elements of object $O_1$ return to the GM agent, since these elements represents the result of the mission accomplished. Therefore, the GM agent receives from the $U_{tech}$ agent the elements $(\Delta^1+\Delta^2+\Delta^3) O_1^{\delta1\delta2,\delta3}$ (FIG. 7) and from the $U_{mark}$ agent the elements $(d^1+d^3) O_1^{\delta1+\delta2+\delta3}$ (FIG. 8). On the other hand, upon the end of invariant 2, the GM agent receives the object $O_1$ with other knowledge elements.

The agent, in this situation performs an update with type 1, level 1 or 2 merges, according to the order of returns from aims and initiates a dialog with the operator, that is, with a person.

The rules that determine this operation will be described below for the case where the return from the $U_{mark}$ agent happens after the return of the $U_{tech}$ agent from the RECO 1 stage, and the latter, after the return of $U_{fin}$ from the validation stage. If the objects arrive in another order, the operation will take place according to other type 1 merge rules. In this case, the GM agent must perform an update with a type 1, level 2 merge, should it perceive the possibility to perform a contraction, while examining the $O_1$ fields. The $d^1$ element is independent of elements $$O_1 \Delta 1 + \Delta 2 + \Delta 3 + \sum_1^6 \delta 1$$

which are the result of the return from $U_{tech}$ and $U_{fin}$, the elements $d^3O_1$, $\Delta^2O_1$, result from the return of $U_{tech}$ and $U_{fin}$, and $\Delta^3O_1$ offers this possibility. Effectively, these elements are introduced as follows:
$d^3O_1$
→interest 2(2)
→alarm 2(2)
→risk 1(1)
$\Delta^2O_1$
→risk=1(1)
$\Delta^3O_1$
→interest 2(1)
→alarm 2(1).

Since none of the three elements takes precedence, a contraction can be made and cause GM to create a new field on $O_1$
$\mu^1O_1$
→interest 2(3)
→alarm 2(3)
→risk 1(2)

It is noted that in the element $\mu^1O_1$ the arguments, namely the numbers that are in brackets, constitute the algebraic sum of the field arguments of elements $d^3O_1$, $\Delta^2O_1$ and $\Delta^3O_1$.

On return from the aim $U_{mark}$, the element d3 can be destroyed because $\mu^1$ replaces it.

Then, according to the rule "if return strat 3 from all UM agents is complete," the GM agent must display on the screen of its man-machine interface IHM the result from the examination 1 stage, that is, the $O_1$ object in its configuration as now established:

$$O_1 \mu 1 + d1 + \Delta 1 + \Delta 2 + \Delta 3 + \sum_1^6 \delta 1$$

with all the alarm, interest, presumption and risk signals. Effectively $O_1$, on return from the invariant 2 in $U_{fin}$, became a presumption, creating the element $\delta^6O_1$ since, because it was an index with control points which is one of the evolution rules from the index type toward the presumption type. The presumption is that the product A is critical because the index and the control points are budgetary deviations on product A. FIG. 9 illustrates the situation at the end of RECO 1.

The display constitutes a call made to the operator, that is, a person, indicating that the examination 1 of the $O_1$ object is finished, that $O_1$ is a presumption, that there are control points from the accidents detected, strategic objects and risk factors. If the person wishes for more detail on control points and accidents, the system causes to be sent back to the GM agent the $O_4$ and $O_{12}$ objects from the $U_{mark}$ agent, the $O_8$ and $O_{10}$ objects from the $U_{tech}$ agent and the $O_2$ object from the $U_{fin}$ agent. The GM agent puts its objects in its structured knowledge base by placing them in its knowledge landscape structured by classes, presented in FIG. 9. This structuring is done in the manner already described beforehand according to the entries in the "property" and "usage" fields, depending on whether these field contents are structuring or not. Then the agent traces the decisional path by looking at the direct links from object $O_1$ fields with the returned objects. It is determined that there is a direct link only with object $O_2$. Therefore the agent adds to the already existing path from $O_1$ to $O_7$ a second path from $O_1$ to $O_2$.

According to these same rules, the knowledge landscape constructed by $U_{fin}$ has been represented in FIG. 9 with a "Deviation" class and 3 decisional paths. We need to note that the decisional paths are traced according to an order of precedence between objects, as a function of their order of creation.

Then the results obtained are assessed to determine if a trend is already drawn which could permit guiding the decision to be made in a certain sense, such a trend is called a type 1 switch. Since the $O_1$ object is the presumption type, it signifies a first switch. By looking at the "type" fields in the two decisional paths of the new objects, the GM agent verifies if there are other trends, which means other type 1 switches. In this case, there is none. It is specifically noted that the $O_2$ object is the control point type. Therefore, only one switch exists, that of $O_1$, which is presumption because it concerns product A, which is critical.

Thus, the type 1 examination of object $O_1$ is finished. However, invariant 3, as has been specified at the beginning of this invariant, must also include a type 1 examination of object $O_3$ so as to retrieve the possible accidents linked to this object. The examination of $O_3$ could have taken place simultaneously with the examination of object $O_1$. But, within the scope of the overall aim of the budgetary follow up, chosen by way of example to describe the present invention, the budgetary follow up must be done under the conditions of speed and low cost. However, these conditions could automatically imply the abandonment of the examination of the object $O_3$, or the spot decision to make this examination could be left to the assessment of the human operator at the end of the examination of object $O_1$. It should be noted however, that the $O_3$ type has passed from index to presumption, for the same reason as $O_1$. The nature of the presumption is "active competition," because $O_3$ has as its context falling shareholder Companies in Japan, all purchased by OPA by the competition. The element $\delta^7 O_3$ is thus created by this change of type. FIG. 9 also shows 3 decisional paths associated with $O_3$. In this case, it proves to be the case that the person considers he can be satisfied with the examination on object $O_1$.

The man-machine dialog which will take place therefore remains within the scope of RECO1 on object $O_1$.

According to the rules that govern the operation of the GM agent, it should call upon the human operator:

If end RECO 1, if $O_1$ is a presumption (critical product A), if there are control points, accidents detected, strategic objects and risk factors,
⇒call upon human operator: do you want more information?

It takes place on the IHM interface screen with a menu indicating the possible choices proposed to the operator, such as control point, accident, . . . , nothing.

The person on looking at the structured knowledge landscape on the IHM interface screen of the GM agent notes that there are four classes, namely the "deviation," "competitor," "technology" and "merger and acquisition" classes. He wishes for a search to be performed on links which might exist between these classes. He then responds, according to his own knowledge and the machine knowledge that he wishes more information on control points and accidents.

This man-machine dialog leads to the creation of portable man-machine dialog objects, such as $O_{M1}$
→Type "interoperability"
→Creator GM
→Connected to ($O_{H1}$: creator GM, type=dialog $O_1$: creator GM, type associated with)
→Property (question)
→Usage (more information?)

$O_{H1}$
→Type (interoperability)
→Creator (Person)
→Connected to ($O_{M1}$: creator GM, type=dialog, $O_1$: creator GM, type associated with)
→Property (response)
→Usage (control points and accidents)
⇒execute update:

$$\mu^2 O_1 \mu 1 + d1 + \Delta 1 + \Delta 2 + \Delta 3 + \sum_1^6 \delta 1$$

→Connected to ($O_{M1}$: creator GM, type associated with, $O_{H1}$: creator GM, type=associated with).

The $O_{H1}$ object thus includes the person's answer. By means of a more advanced dialog that results from element $\mu^1 O_{H1}$ the person expresses that he wishes more detail on the control points that have the usage field, "investment product A" and accidents that have the usage fields, "new entry."

In execution of these orders issued by the person the GM agent is going to implement a new decision stage called invariant 4 which constitutes a type 2 examination with the purpose of performing merges—connections between control points and accidents which have been previously detected.

Invariant 4: Merge—connection

By following rules foreseen for this purpose, the GM agent directs itself to the agent it considers the most involved in the problem. Insofar as the object to be examined is a presumption indicating the product A is critical that is, it, to some degree, concerns a technical problem, the GM agent addresses itself to the $U_{tech}$ agent. $U_{tech}$ thus becomes the master agent of the RECO2 stage.

In order to execute this mission, the $U_{tech}$ agent, by applying the aim rule "if aim=RECO2 ($O_1$, $O_{H1}$), the strategy is defined by the specified rules, in a manner analogous to what has been previously described herein. An implementation of this strategy is described with reference to FIGS. 10 to 12.

The $U_{tech}$ agent should apply a first strategy rule 4.1 to search for the connection—merge type, following:

If strat=strat 4.1=search for connection type—merge ($O_1$, $O_{H1}$, overall aim, condition fast and low cost, . . . ),
⇒do "establish remote knowledge of $O_1$ links, type=accident, usage=new entry or type=control points, usage=investment product A, by $U_{fin}$ and $U_{mark}$
⇒do "establish knowledge of $O_1$ links" in $U_{tech}$
⇒if return "establish remote knowledge of link"=$O_2$ of $U_{fin}$ and $O_4$ of $U_{mark}$ and if return "establishment of $O_1$ link"=$O_{10}$ of $U_{tech}$,
perform type 2 merge on accidents;
do distributed connection between control points and accident.

On the accomplishment of this rule, the $U_{tech}$ agent requests these sibling agents $U_{fin}$ and $U_{mark}$ to send it those objects which are the type "accident" and usage "new entry" or which are the type "control point" and usage "investment product A." It turns out that in the knowledge base of the $U_{fin}$ agent only the $O_2$ object answers these requirements. In effect, $O_2$ is a control point and its usage is "investment product A." Therefore $U_{fin}$ sends object $O_2$ to $U_{tech}$. The $U_{mark}$ agent sends object $O_4$ to $U_{tech}$ which is the only object answering the requirements. In effect, $O_4$ is the type "accident" and usage "new entry." $U_{tech}$ itself possesses object $O_{10}$, which is the type "accident" and usage "new entry" and has a link with $O_1$ which has the type and usage in question. It possesses $O_8$ which again is the type "control point" but has usage "development product A." This control point, by reason of its different use, will not be taken into consideration.

Since objects $O_4$ and $O_{10}$ are both the type "accident" and have the same usage "new entry," $U_{tech}$, in application of rules that have been conferred on it in the scope of strategy 4.2, will try to establish whether the two objects may be merged. $U_{tech}$ could perform this merge if it could establish that $O_4$ and $O_{10}$ are the same company. It involves merging two different objects, namely the $O_2$ and $O_{10}$ objects, which could correspond to the same world object. Such a merge is called a type 2 merge, We should remember that the type 1 merge involves the merge of two versions of the same object updated by two different agents. In this case their knowledge elements $\delta$, $\Delta$ or d are merged.

The establishment of the type 2 merge of the $O_4$ and $O_{10}$ objects presupposes knowledge of the identity of the "new entry" company constituting object $O_{10}$, since the name of the new entry which constitutes object $O_4$ is known.

The $U_{tech}$ agent knows that object $O_{10}$ has been created in the structure of its channel agent $C_{old\text{-}tech}$. This channel agent has available two tracking agents, namely $P_{conc}$ which has all the competitors in its DM base and tracking agent $P_{press}$ which has available a knowledge tree wherein press articles are available concerning companies and world events on the economy and politics. It should be noted that the new entry comprising object $O_{10}$ has been found by inquiring to find out if a competitor possessed the technology that constitutes object $O_9$.

As FIG. 10 shows, the implementation of strategy 4.2, will be done in the analysis loop controlled by $A_{conc}$, which is the loop responsible for creating object $O_{10}$. This strategy implies the creation of two cognitive agents FOC and VAL by the $A_{conc}$, analyzer agent according to a predetermined action plan. Then, the $A_{conc}$ agent makes a request to the VAL agent so that it performs a search for equality between the $O_{10}$ and $O_4^{d1+d2}$ objects in the $DM_{conc}$ data. However, the object $O_4$ was created in $DM_{SOC}$. In its "usage" field is indicated that it involves company Y.

The VAL agent makes a request to the FOC agent to retrieve $O_4$ in $DM_{conc}$, which leads to the creation of an object $\Delta^1 O_4^{d1+d2}$. After receipt of this object, VAL uses the knowledge rule foreseen for this purpose to make a search by name for equality within $DM_{conc}$.

If this search fails, it formulates a new request to FOC so as to perform a search by form for equality. For this purpose FOC will write a fresh line in $DM_{conc}$ for all the information it possesses on company Y and create object $\Delta^1 O_4^{d1+d2}$ as $\Delta^1 O_4^{d1+d2}$
→Form (type=axis, creator FOC from $A_{conc}$, $DM_{conc}$)

This object is sent back to VAL which will establish the scalar product through term-by-term comparison in all the lines of $DM_{conc}$. Since the new entry $O_{10}$ must normally appear in $DM_{conc}$ although it cannot be identified by its name, VAL will designate the competitor sought as being the one for which the term-by-term comparison yields a maximum correspondence with the terms of the line written by FOC.

When $O_{10}$ is thus identified as company Y, the merge can be performed of the $O_4$ and $O_{10}$ objects, considered as replicates, which entails the creation of the object $\Delta^1 O_{10}$.

$\Delta^1 O_{10}$ (knowledge merge)
→creator ($SCAN_{prod}$ and $SCAN_{conc}$)
→Form 1=merge of $O_{10}$ and $O_4^{d1+d2+\Delta 1}$ forms
→Form 2=original form ($O_4$ in $DM_{prod}$)
→Form 3=form in $DM_{SOC}$ ($d^1 O_4$)
→Connected to ($O_5$: creator SCAN of $A_{prod}$, type=contained in, link from $O_4$), ($O_{11}$: creator SCAN of $A_{SOC}$, type=contains, link from $O_4$), ($O_4$; creator VALID of $A_{CONC}$, type=replicate)
→Usage (new entry, name=Y) (inherited from the name of $O_4$)

The object $\Delta^1 O_{10}$ inherited all forms of $O_4$, in particular entry fields of $O_{10}$ which were empty are filled out by the fields from $O_4$.

Also created was
$\Delta^2 O_4^{d1+d2+\Delta 1}$
→Type: (null, ghost)
→Connected to ($O_{10}$: creator VALID of $A_{CONC}$, type=replicate).

Then $\Delta^1 O_{10}$ and also $(\Delta^1+\Delta^2)O_4$ are sent back to the $U_{tech}$ agent, although $O_4$ ceased to exist and is only a "ghost." On its path, object $O_{10}$ inherits from the agents that it traverses the knowledge from its replicate $O_4$, then the agent destroys it.

The type 2 merge, as has been previously described herein by taking the objects $O_{10}$ and $O_4$ as an example, implies the implementation of two rules at the time of returning to the master agent from the merge, namely, on the one hand, the destruction of the replicate, in the case of the object $O_4$ example, and, on the other hand, the change of the linking. Former links to $O_4$ become links to $O_{10}$. It should be noted, however, that the replicated object in the cognitive agent base, in this case $O_4$, although it is destroyed, is preserved as a "ghost" object, as is represented schematically by a circle with a dashed line in the respective knowledge bases. This retention is necessary to permit changes to links for all objects which arrive and were linked to a replicate that has been destroyed. Indeed, every time a new object arrives at an agent, its "connected to" field is checked to see which contains a ghost object, which it is necessary to replace by its replicate object.

After the merge of the $O_{10}$ and $O_4$ objects, which are accidents of the same utility, the master agent of the merge—connection operation RECO2 must process object $O_2$ with respect to object $O_{10}$, where the object $O_2$ is a control point. This control point is not in its own knowledge base, but rather in the knowledge base of the remote agent $U_{fin}$, the $U_{tech}$ agent should initiate two kinds of processing, namely a first local processing on object $O_{10}^{\Delta^1}$ and a second distributed processing on the object $O_{10}^{\Delta^1}$ and $O_2^{\delta^1}$. The latter processing in order to establish the possible merge—connection for the control point which constitutes $O_2$, should be done, according to a rule, in the agent that has created the control point. Here, the $O_2$ creator is the $U_{fin}$, agent. The $U_{tech}$ agent therefore sends the $O_{10}^{\Delta^1}$ and $O_2^{\delta^1}$ objects to $U_{fin}$, which had initially been transmitted to it by $U_{fin}$.

Figure 11:
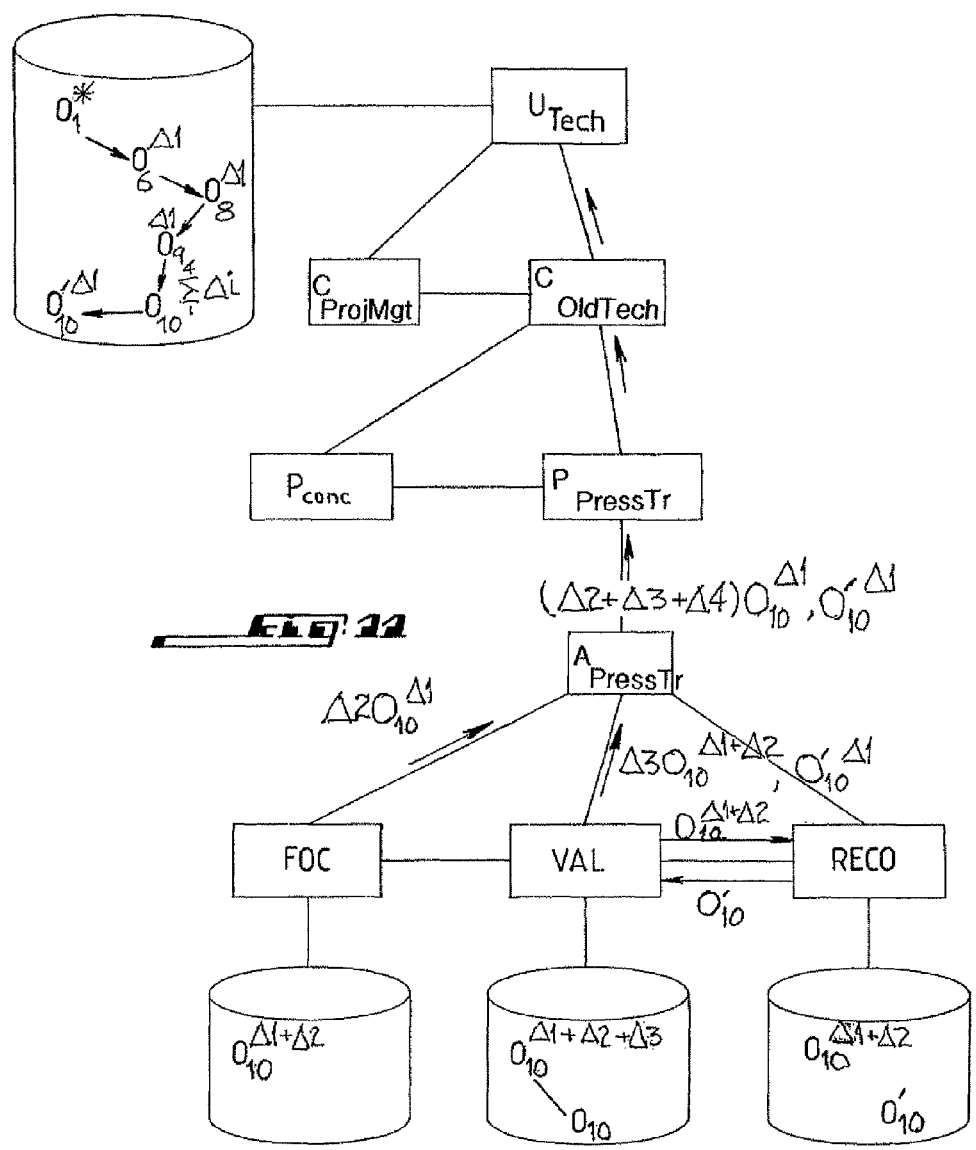
FIG. 11 illustrates schematically the local processing of specification on object $O_{10}$ made by the $U_{tech}$ agent in the scope of invariant 4.

Although the RECO 2 linking operation of $O_{10}$ and $O_2$, executed in a relocated fashion by $U_{fin}$, will take place at the same time as the local processing which has the aim of obtaining specifications on the $O_{10}^{\Delta 1}$ object, first of all the local processing on the $O_{10}^{\Delta 1}$ object will be described below by referring to FIG. 11.

Object $O_{10}^{\Delta 1}$ is identified as a competitor company, the name of which is now known. It is thus appropriate to look more closely at this company. The investigation procedure takes place according to specific aim and strategy rules, which are predetermined but chosen from among possible aim and strategy rules for each agent, according to previously obtained results. Since the application principle of aim and strategy rules has already been described herein, the mechanism of these rules and their application for implementation of the aim=to specify $O_{10}$ will not be restated in detail. This mechanism refers to the figure.

Specifications of objects until now have been obtained by scanning information which is internal to the company in question. However, insofar as object $O_{10}$ represents another company with specific data, to which the company performing the budgetary follow up does not have access, it is appropriate to search for specifications in data that are accessible outside the company. These data will be sought in publications made in the economic and political domain on the "new entry" competitor company. Insofar as at the time of the structuring the $U_{tech}$ agent's services, its $C_{old-tech}$ agent Channel had already created a "PRESS" tracking agent, $P_{press}$, the structuring continues by creating $P_{press}$ from the $A_{press}$ analyzer agent and by the latter in turn creating three cognitive agents FOC, VAL and RECO.

Figure 12:
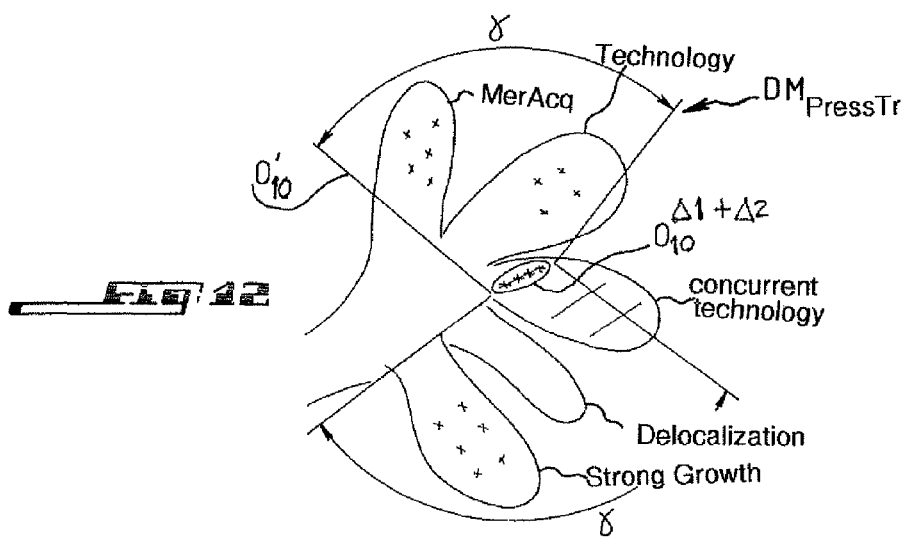
FIG. 12 illustrates schematically the structured knowledge base $DM_{press}$.

The structured knowledge base is the textual database $DM_{press}$ in the form of a concept tree structured into classes such as competitors, technology, merge—acquisition, strong growth, relocation classes etc, as FIG. 12 shows schematically. The agent $A_{press}$ passes a request to FOC to retrieve $O_{10}^{\Delta 1}$ in $DM_{press}$, from whence the creation of the element $\Delta^2 O_{10}^{\Delta 1}$ takes place.

The VAL agent is a cognitive agent of a type suited to position objects with respect to one another, to establish correlations such as the scalar products. In this case, at the request of $A_{press}$, it determines the cone of observation in the $DM_{press}$ domain, in which the RECO agent must observe $O_{10}^{\Delta 1+\Delta 2}$, as is illustrated schematically in the figure. RECO determines in the classes located in zones inside the cone of observation corresponding to press articles where it is a question of the company Y which constitute the object $O_{10}$. Thus, VAL requests RECO to perform a monitoring called "active large angle monitoring," for $O_{10}$ in the classes located in the indicated cone. The RECO agent creates the object $O'_{10}$ (creation)
→Type (marker point)
→Creator (RECO)
→Form (type=zone, creator=RECO, $DM_{press}$, index=position in concept tree, form=references on press texts, media=source text)
→Usage (M & A, technology, high growth).

On return of the object to VAL it creates:
$\Delta^1 O'_{10}$
→Type (zone of interest)
→Connected to ($O_{10}$, type=associated with) $\Delta^3 O_{10}$
→Connected to ($O'_{10}$, type=associated with)

The FOC agent has the function to retrieve the $O_{10}^{\Delta 1}$ object in the press. It creates the object:
$\Delta^2 O_{10}$
→Form (type=task, creator=FOC, $DM_{press}$, index, form=branch concept, media=tree concept)

These objects are sent back to the $A_{press}$ agent which on passage of $O_{10}^{\Delta 1+\Delta 2+\Delta 3}$ created
$\Delta^4 O_{10}$
→type (presumption: important situation)

This new presumption is created because $O_{10}$ changed form, passing from the axis type to the task type, and, is associated with a zone of interest. This presumption signifies that there is now a second switch in the $U_{tech}$ agent's reasoning.

Below the implementation the RECO2 merge—connection will be described between objects $O_{10}^{\Delta 1}$ and $O_2$, which is done by the $U_{fin}$ agent responsible for creating object $O_2^{\delta 1}$.

The $U_{fin}$ agent is responsible for searching for connections between the objects $O_2^{\delta 1}$ which are a deviation from the investments of the company's product A for which the budgetary follow up is performed and $O_{10}^{\Delta 1}$ which is the new entry company Y.

The $U_{fin}$ agent is the creator agent of object $O_2$, which is a control point. Within the scope of RECO2 connection $O_2$ and $O_{10}$, $U_{fin}$ must look for an agent which is capable of obtaining and processing external data concerning the "new entry" company $O_{10}$. $U_{fin}$ has already created a channel agent $C_{eco-pol}$ beforehand in the scope of invariant 1; it requests the COTS agent to give the agent the aim and strategy rules plus data so as to allow it to process the external data, which means any information which has specifically been published in the press. The $C_{eco-pol}$ agent chooses the $P_{Asia}$ agent from the two tracking agents it has already created because the competition is stronger in Asia and since it should work under conditions of fast speed and low cost. The tracking agent is in the position to monitor the Asian press. The Asian press domain is structured in the form of a $DM_{Asia}$ concept tree. Such concept trees are known. In such trees the press articles are arranged by structuring classes in the manner already illustrated in FIG. 12.

Figure 13:
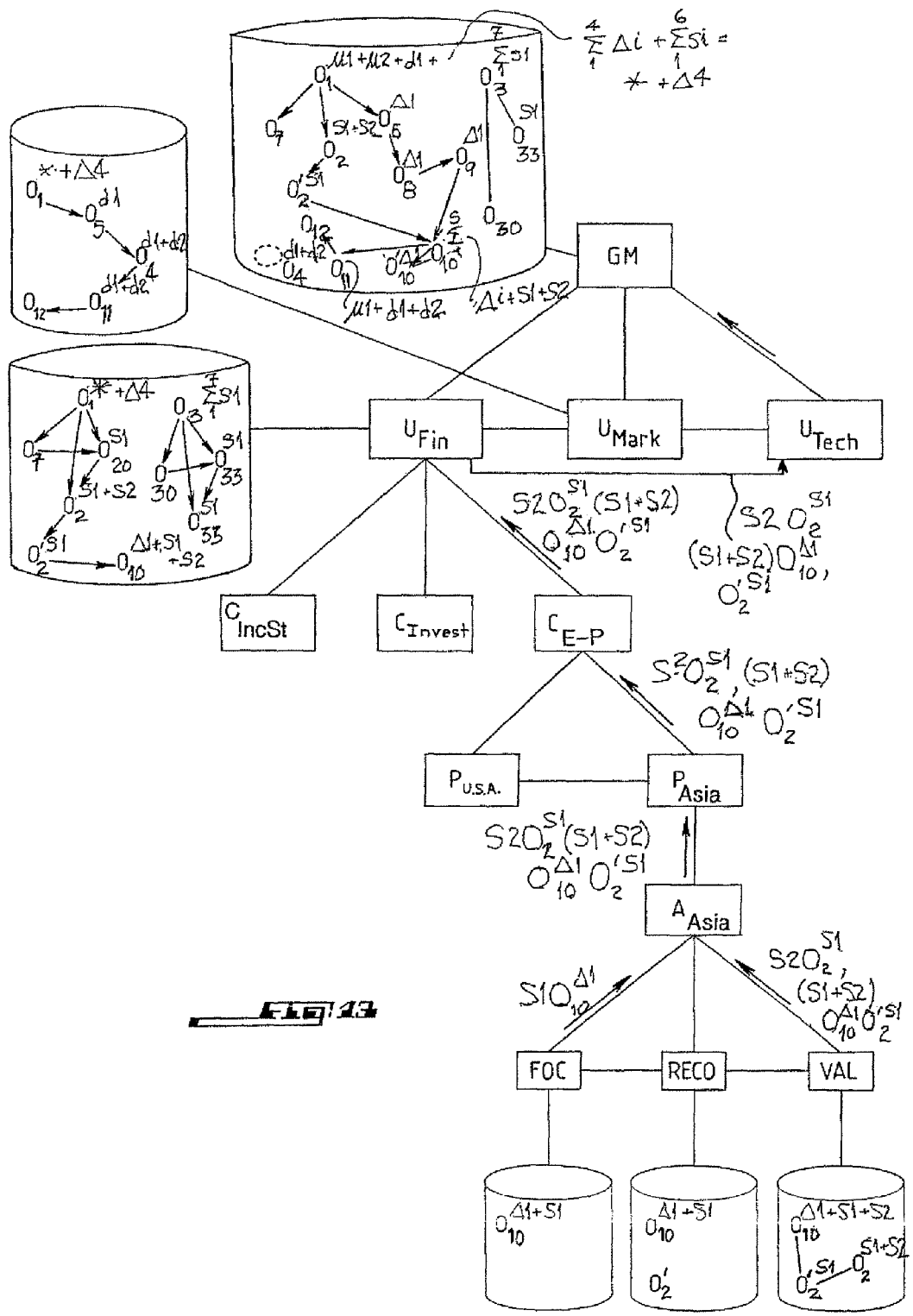
FIG. 13 illustrates schematically the distributed processing by $U_{fin}$ on objects $O_{10}$ and $O_2$.
Figure 19A:
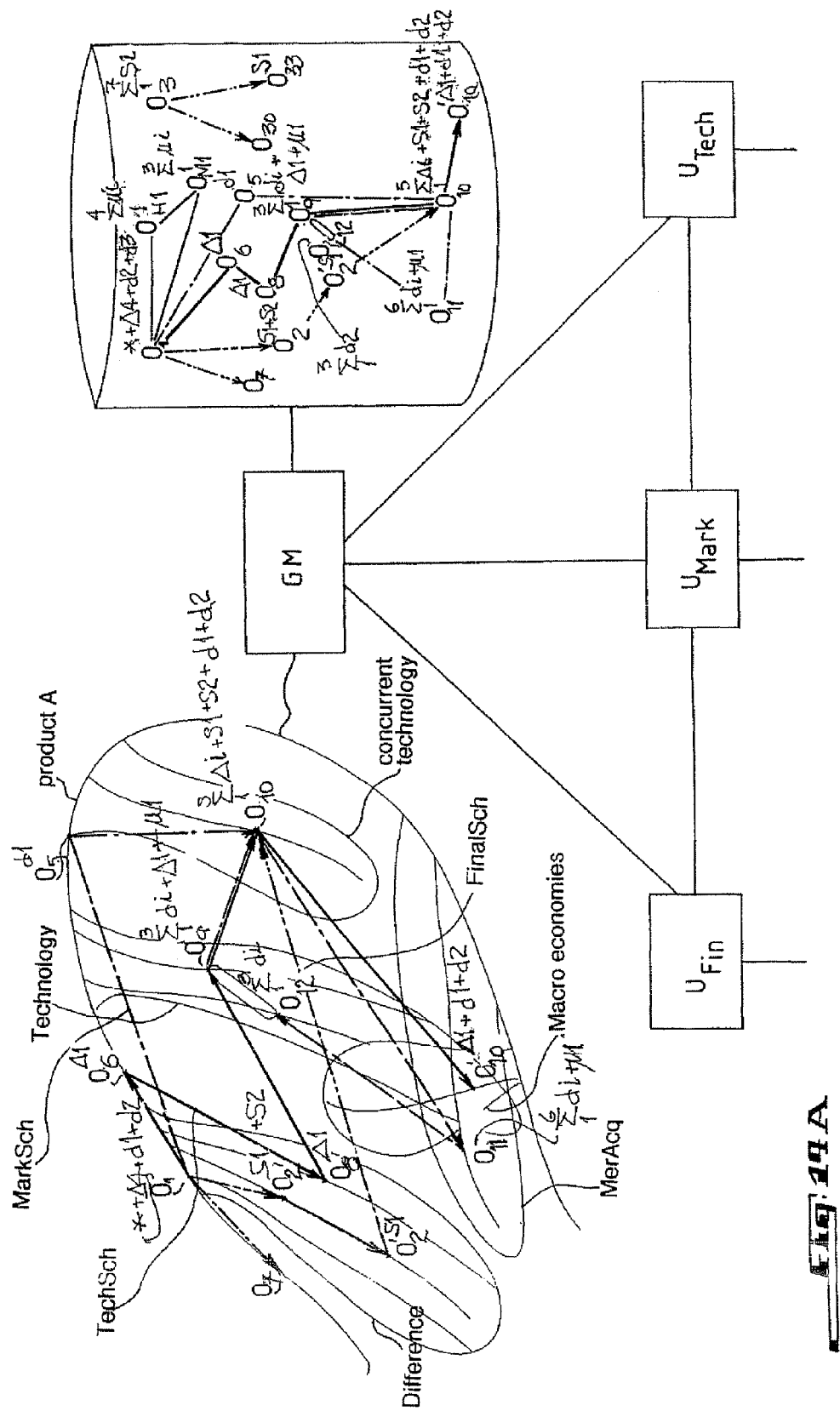

As FIG. 13 shows, in application of aim and strategy rules to be used in this case, the tracking agent $P_{Asia}$ is associated with the analyzer agent $A_{Asia}$, which creates three cognitive agents FOC, RECO and VAL.

The $A_{Asia}$ agent requests FOC to retrieve $O_{10}^{\Delta 1}$ in $DM_{Asia}$, thus creating $\delta^1 O_{10}^{\Delta 1}$. Then it requests VAL to make the connection between $O_{10}^{\Delta+\delta 1}$ and $O_2^{\delta 1}$.

The VAL agent requests the RECO agent to perform an active monitoring directed inside $O_{10}$ since it involves searching for the connection between $O_{10}$ and $O_2$. For the active monitoring, VAL defines as the criterion the investment of the new entry $O_{10}$ in product A. It is appropriate to look at all press articles which refer to investments in product A by $O_{10}$. After execution of this request the RECO agent creates the $O_2'$ object as $O_2'$ (creator)
→type (marker point)
→creator RECO ($DM_{Asia}$)
→Form (type task, $DM_{Asia}$ structure, creator RECO, index, form=N reference texts, media=text sources)
→Usage (investment product A)
→property (deviation).

A number of applicable texts N must be reached for the creation of O'2. On return from the $O_2'$ object, VAL decides to transform this object into a control point since it has the same usage (investment product A) as $O_2$, which is control point and the same "deviation" property. The VAL agent creates:
$\delta^2 O_2^{\delta^1}$
→Connected to (O2': creator VAL, type=associated with)
$\delta^1 O_2'$
→Type (marker point→control point)
→Creator VAL
→Connected to ($O_2$: creator VAL, type=associated with)
→Connected to ($O_{10}$: creator VAL, type=connected to)
$\delta^2 O_{10}^{\Delta 1+\delta 1}$
→Connected to ($O_2'$: creator VAL, type: connected to)

The FOC agent, in response to the request "retrieve by name in structured data" created the object $\delta^1 O_{10}{}^{\Delta 1}$
→Form (type=zone, creator $FOC_{Asia}$, $DM_{Asia}$, index, form=reference in texts, media=text sources)

The $U_{fin}$ agent, at the end of this operation sends back to the $U_{tech}$ agent elements $\delta^2 O_2{}^{\delta 1}$ with a link to $O_2'$, $(\delta^1+\delta^2)O_{10}{}^{\Delta 1}$ with a link to $O_2'$ and $O'_2{}^{\delta 1}$ with a link to $O_{10}$.

On receipt of these elements, the $U_{tech}$ agent then proceeds to a type 1 merge on object $O_{10}$, then traces the corresponding decisional path. In effect, it has the rule to draw such a decisional path each time an object arrives. It is documented that there are now two decisional paths at the $U_{tech}$ level to go from object $O_1$ to object $O_{10}$. In addition, the decisional paths now contain two type 1 switches on $O_1$ and $O_{10}$, thus creating $\Delta^4 O_1$ and $\Delta^5 O_{10}$.

Thus, $U_{tech}$ sends back to the parent agent GM two decisional pats or schemes. At the end of RECO 1, the agent GM had two decisional paths for O1 and one presumption. At the end of the RECO2 phase, it now passes to three decisional paths and two presumptions. It should be noted that, in order to establish that the decisional paths have object $O_{10}$ as a destination point, a field is foreseen in all objects specifying the precedence type which gives the order in which objects are created. This guarantees that there is only downward movement. For example, at the time of creation of object $O_{10}$, it is specified that it was created after $O_9$.

After the invariant 4 stage which has as its aim the merging—connection of control points and accidents, an invariant 5 stage may be foreseen for technical interpretation of presumptions implying a man-machine dialog and a decision made by the machine.

Invariant 5: Technical analysis and decision

Invariant 5, which constitutes a supplementary examination stage called RECO3, performs the technical analysis of presumptions to lead to decision stages corresponding to strong switches, leading to the final decision. The choice of presumptions which are going to be analyzed is made by the person through man-machine dialog. This new invariant also takes place according to the specific aim and strategy rules, which should imply furthermore agents at a high level in the decision structure.

Thus, by way of example, for the GM agent the launching of aim rules from the RFCO 3 operation and the strategy are the following:

Aim rule (initiate RECO 3)
If aim=budgetary follow up and restructuring,
    if return RECO1 $(O_1{}^{\delta 1_f \delta 2+\delta 3})$ from $U_{tech}$, if $O_{H1}$ connected to $O_1$, $O_{H1}$ type=interoperability, if property of $(O_{H1})$=response, if usage $O_{H1}$=analysis presumption (important situation)>
⇒do strat=strat 1.2+strat 5 $(O_1)$ $(O_{H1})$
Strategy rule
If strat=strut 5 $(O_1)$ $(O_{H1})$ (overall aim, . . . ), if type $(O_{H1})$=interoperability, if Usage $(O_{H1})$=analysis presumption (important situation)
⇒do "establish link", $(O_1)$ type presumption (important situation), (return $O_{10}$)
⇒do "establish link" $(O_{10})$ (type=zone of interest) (return $O_{10}'$)
⇒if usage $(O_{10})$=new entry and if creator $(O_{10})$=$A_{SOC}$ in $U_{mark}$ branch send aim 3=RECO—stage 3 $(O_1)$ $(O_{H1}, O_{10}, O_{10}')$ (overall aim, $DM_{mark}$) to $U_{mark}$.

These rules have only been given to illustrate their structure and indicate that the $U_{mark}$ agent must be used to contribute some supplementary decision elements. For the understanding of the RECO3 stage it is not necessary to describe how the supplementary knowledge elements are created in the $U_{mark}$ structure. It is sufficient to know that the procedure for processing objects in this structure is terminated by the observation that it is also possible to perform a merge of objects $O_9$ and $O_{12}$, called a dual type merge. In effect the object $O_9$ concerns the critical technology $X_1$ which causes problems in the product A. Object $O_{12}$ constitutes the patent that belongs to the new entry competitor $O_{10}$ and concerns the $X_1$ technology. In the diagrams the dual merge is indicated by a double line. However, this merge constitutes a strong contradiction shown by contradictory accident and marker control point types—of objects $O_{12}$ and $O_9$, insofar as it signifies that the competitor company, object $O_{10}$, is investing in product A although the $X_1$ technology is difficult. This contradiction leads to assigning to $O_{10}$ the "decision stage" or "strong switch" type, to $O_9$ and $O_{12}$, the "genesis strong switch" type and to $O'_{10}$, which is the zone of interest associated with $O_{10}$, the "operational objective under close surveillance" type. From this fact the object $O_{11}$ which is connected to $O'_{10}$ becomes the presumption type (important OVA), the usage of $O_{11}$ is OPA. FIG. 14A gives the decision schemes of the GM agent at the end of RECO3 before the final man-machine dialog.

The final decisional process with man-machine dialog includes several stages, a first path-interpretation stage, a second decision-interpretation stage with merge of schemes and a third merge stage of the interpretation and decision schemes.

The interpretation rules of the schemes are the following:
if overall aim=budgetary follow up and restructuring, if return RECO3 done and if scheme in GM=$(O_1, O_7; O_1, O_2, O_2', O_{10},$ cycle $(O_{11}, O_{12}, =O_9, O_{10}), O_{10}'; O_1, O_6, O_{10},$ idem; $O_1, O_5, O_{10},$ idem):
⇒search for creators of each of the schemes (return branch $U_{fin}, U_{tech}, U_{mark}$) to qualify schemes. Then store schemes
⇒interpret schemes by using control points
⇒interpret finance path: look for link from $O_1$ (type=control point, creator=$U_{fin}$, branch), if property of $O_2$=TB "console" deviation and if use of $O_2$, $O_2'$=investment product A, if $O_2'$ connected back to $O_{10}$, if $O_{10}$ usage==new entry and if $O_1$ type=presumption critical product A, then store the interpretation: "the critical product A has the budgetary deviations in the investment, in internal situation and at a new entry's premises (merge scheme$_{fin}$ and scheme$_{tech}$)

Then the GM agent proceeds in a manner analogous to the interpretation of the technical path by requesting links from the object $O_1$ of the type=control point, whose creator is the $U_{tech}$ branch in the scheme$_{tech}$. It implies the return of object $O_8$. Under conditions, if $O_8$ property=TB 'console' deviation, if usage of $O_8$=product A development plan, if $O_8$ is connected to $O_9$ which is the $X_1$ technology, if the property of $O_9$=risk and difficult, it is then appropriate to store the technical path interpretation:

"there are some budgetary deviations in the development plan of product A, which is connected to a difficult technology $X_1$."

Then, the GM agent must interpret the marketing path requesting links for $O_1$ from the marketing scheme. There is no return object. Then the interpretation of the marketing path is stored as: null.

The second stage, the decision stage interpretation with merge of schemes, takes place in application of the decision stage interpretation rules, which implies searching for strong switches in $O_1$ links and the search for the genesis strong switch in the $O_{10}$ links.

Under conditions, if type ($O_{10}$)=decision stage (strong contradiction), if usage of $O_{12}$=patent competitor, if usage ($O_9$)=technology and if $O_9$ property=difficult, if use of $O_{10}$=new entry=competitor sub-class, it is necessary to store the interpretation:

"A strong switch concerns the new entry Y. It is a strong contradiction because the difficult technology X has been recently patented by the new entry. The merge thus proceeds of the mark scheme and tech scheme."

The third stage of merging interpretations and decision schemes, implies that a first man-machine dialog takes place according to the pre-established rules pursuant to which the budgetary follow up and restructuring aim, as a function of the interpretations of schemes and the decision stage, the GM agent must make the following final interpretation:

"The product A is critical, with budgetary deviations in investments, in internal data and in the new entry Y's external data. There are budgetary deviations in the development plan of product A, connected to a difficult technology X1. A strong switch concerns the new entry Y. It is a strong contradiction because the difficult technology X1 has been patented recently by the new entry."

The GM agent must now pronounce the machine decision according to the rule: if budgetary deviations of a product A are connected to a difficult technology patented by the competition, store machine decision:

Machine decision trend continue product A.

It is appropriate to update the dialog object representing the machine:

$\mu^2 O_{M1}$

→property (machine decision trend)

→usage (continue product A).

It should be noted that the final interpretation is the concatenation of interpretations of schemes and the decision stage and the machine makes its decision on the association of three facts, namely the budgetary deviations concerning product A, the difficult technology and the competing patent.

The GM agent requests human confirmation according to the dialog 1 rules:

if overall aim=budgetary follow up and restructuring, if return RECO3, if interpretation done, if $O_{M1}$ exists, type=interoperability, linked, to $O_1$, and if $O_{M1}$ property=machine decision trend, if $O_{M1}$ usage=continue product A, if $O_1$ presumption=critical product A, ⇒call operator: the presumption of the $O_1$ index is: critical product A. The machine decision trend is: to continue product A. Human decision on O1? choice:

continue product A ask for more information halt product A analysis in progress (response by default)

⇒execute update:

$\mu^3 O_{M1}$

→Property (question)

→Usage (what is the human decision on $O_1$?)

$\mu^3 O_{H1}$

→Property (response)

→Usage (analysis in progress)

In other terms, the human decision requested relates to the $O_1$ index. Another human decision requested will relate to other objects, for example $O_{11}$, to measure the importance of the OPA which represents $O_{11}$. The conclusion of this dialog will be that $O_{11}$ is "presumption" type, of "risky OPA" kind.

It should also be noted that the man-machine dialog is flexible due to the default "analysis in progress" response which permits the machine to continue even though the person did not yet respond.

A rule for re-launching by the operator is now implemented and rule for decision on $O_1$ which gave rise to an update, if the human decision is "continue product A"

$\mu^4 O_{H1}{}^{\mu1+\mu2+\mu3}$

→Usage (continue product A).

Following the operator's call "have you any other information to provide," and the return "budgetary deviations are due to the difficult and strategic technology," the GM updates object $O_1$ by affirming the machine decision:

$d^3 O_1$

→Type (decision: continue product A)

→Creator (machine confirmed by human)

→Property (TB 'console' deviation due to the strategic technology).

At this stage the $O_1$ object has passed from the "presumption" to "decision" type. Synergies between the $O_1$ and $O_3$ indices are established, showing the importance of OPA competitors. This information will swing the shareholder decision which will confirm the machine decision.

After this update, the GM agent halts invariant 5. Of course if the person wishes specifications for objects that have been created and to learn other aspects that have not yet been detailed until now, the system continues according to aim and strategy rules and pre-established man-machine dialog, FIGS. 14A and 14B illustrate the results of the decisional process at the end of invariant 5, that is, for decision and man machine dialog, which has just been described. These results are presented in the form of the decisional paths in the database of the portable knowledge objects and structured knowledge base, for each agent, namely the GM agent and the child agents $U_{fin}$, $U_{mark}$ and $U_{tech}$, respectively represent a collective knowledge system CKM and individual knowledge systems IKM. In structured knowledge databases and structured knowledge, the knowledge objects are connected in the order of their creation. The configuration of knowledge objects thus connected constitute a decisional path or scheme which represents the departure point and the arrival point of the reasoning which has been performed, with the intermediate micro-decisions constituted by objects lying between the departure and arrival points. The different decisional paths code the reasoning, that is, a dynamic process, by a structure of static objects.

It is documented that the structured storage and knowledge bases of the GM agent include the three decisional paths of agents $U_{fin}$, $U_{mark}$ and $U_{tech}$, each of the agents illustrating the decisional path between the $O_1$ and $O_{10}$ objects browsed in their specific knowledge domain. The GM agent merging the three decisional paths or schemes thus performs an individual knowledge merge reflecting the reasoning made by the different people who having studied the same problem, under different points of view of the real world, each in its domain.

The control method of a decisional process, according to the invention, thus succeeds in the realization and the storage of a compact and simple structure for the decisional pats with complex dynamics. The process becomes a control method for a multiple decisional process establishing the collective intelligence.

It should be noted that the decisional process by detection of intervening events in the real world, qualified indices, control points and accidents reaches the final decision stage by passing through a first phase called presumption, which constitutes a level 1 switch which is short on reasoning, reflecting a simple trend and decision stage, called a level 2 switch, which is a strong switch clearly indicating the direction in which the reasoning should progress.

The presumption or weak switch stage is documented, for example, by induction when two objects present a certain type of link, for example, when an index is connected to a control point, such as object $O_1$ of the "index" type which is connected to object $O_2$ of the "control point" type. We are also faced with a presumption when an object is connected to an operational objective, for example object $O_{11}$ which is connected to the object $O'_{10}$ ("critical OPA"), thus by becoming a presumption to be a critical object. We are also faced with a presumption if we note a change of form, that is, if an object takes on more and more importance, for example when an object detected in the form of an axis becomes a task or a zone, the presumption is then introduced in the form of an important situation. Such was the case of object $O_{10}$.

A decision stage or strong switch is noted in the form of a strong contradiction such as in this example where a difficult technology is, however, patented by a competitor.

The present invention realizes a collective decision-making of several machines, each in cooperation with its user, representing a collective decision-making according to several human decision schemes.

The decision scheme representation mode in the form of successive links between the portable objects distributed between several users permits capitalizing upon and storing the human decision schemes, in a compact and flexible form so as to optimize the capitalization of the knowledge and the collective intangible capital.

The invention has just been described in the application of the budgetary follow up and restructuring. Of course, the invention is usable in other domains and will take place according to aim and strategy rules and plans analogous to those just described, according to the principle emphasized in this description.

It should be further noted that the system of the invention is a self-learning system. Indeed, if the system controls machines according to the established rules, and reaches an unforeseen situation, the system stops and signals this shutdown to the human operator. The person then has the possibility of taking over the control of the continuation of the decisional process himself, of course according to rules corresponding to those according to which the machine operates. The system will store the control performed by the human operator and will thus be in the position to control the process itself the next time it is in the situation where it was previously forced to stop.

In summary, the invention relates to a process of collective artificial intelligence distributed between several users. It automates human intelligence. The process relies on the standardization of human reasoning, by means of the cognitive invariant, as shown in the example of the budgetary follow up and restructuring. This standardization permits not defining all possible cases of human reasoning, and only storing in the machines the major invariants of the reasoning. Thus, the process can adjust to different applications and learning curves by generalization of a standard knowledge toward an adaptive knowledge.

In particular the invention is transposable from the integrated management of companies application to collective analysis and decision in the stock market domain.

APPENDIX I

Specific Aim and Strategy Rules of Invariant 1 of GM, UM, C on Initialization

GM

Aim Rule

[if Aim=Budget Follow Up & Restruct (d°1, Cond1, CKM Profile, State, Structure K), if Cond1=(Fast, low Cost), if Profile=Standard, if State=Init, if Structure K=DH, →Strat=Strat1 (Overall Aim, Cond1, Profile, State, DH)=strat 1.0+strat 1.1+strat 1+2]

Rule of Strat 1.0 (services structuring)

[If strat=Strat 1.0 (Overall Aim, Cond1, Profile, State, GM), if Overall Aim=Budget Follow Up & Restruct, if Cond1=(Fast, low Cost), if Profile=Standard, if State=Init, →Send Aim 1=Strat 1.0 (Overall Aim, Cond1, Profile, GM) to COTS Service CKM →If return COTS Services=Services 1, Services 1=($U_{Fin}$, $U_{mark}$, $U_{Tech}$), to create master user agents (UM)=Services 1 and to execute end Strat 1.0 (Services 1)]

Rule of Strat 1.1 (data structuring)

[If strat=Strat 1.1 (Overall Aim, Cond1, Profile CKM, State, Services 1, Structure K), if Overall Aim=Budget Follow Up & Restruct, if Cond1=(Fast, low Cost), if Profile=Standard, if State=Init, if Services 1=($U_{Fin}$, $U_{Mark}$, $U_{Tech}$), if Structure K=DH →Send Aim 1=Strat 1.1 (Overall Aim, Cond1, Services 1, DR) to COTS Data CKM →If return COTS Data=Data 1, Data 1=($DM_{Fin}$, $DM_{Mark}$, $DM_{Tech}$) extract from DH, execute Structure k(n−1)=Data 1 and do end Strat 1.1 (Data 1)]

Rule of Strat 1.2 (invariant 1)

[If strat=Strat 1.2 (Overall Aim, Cond1, Profile, State, Structure K, if Overall Aim=Budget Follow Up & Restruct, if Cond1=(Fast, low Cost), if Profile=Standard, if State=Init, if Structure K=($DM_{Fin}$, $DM_{Mark}$, $DM_{Tech}$), →Send Aim=Strat 1.2=Detection indices (Overall Aim, Cond1, State, $DM_{Fin}$) to $U_{Fin}$]

$U_{Fin}$

Aim Rule

[if Aim=Detection index (Overall Aim, Cond1, Profile $IKM_{Fin}$, State, $DM_{Fin}$,), if Overall Aim=Budget Follow Up & Restruct, if Cond1=(Fast, low Cost), if Profile=Standard, if State=Init, →Strat=Strat1 (Overall Aim, Cond1, Profile $IKM_{Fin}$, State, $DM_{Fin}$)]

Rule of Strat 1.0

[If strat=Strat 1.0 (Overall Aim, Cond1, Profile, State, $U_{Fin}$), if Overall Aim=Budget Follow Up & Restruct, if Cond1 (Fast, low Cost), if Profile=Standard, if State=Init, →Send Aim 1=Strat 1.0 (Overall Aim, Cond1, Profile, State) to COTS Service $IKM_{Fin}$ →If return COTS Services=Services 1, Services 1=($C_{compta}$, $C_{Invest}$, $C_{eco-Pol}$), create channel agents=Services 1 and execute end Strat 1.0 (Services 1)]

Rule of Strat 1.1
[If strat=Strat 1.1 (Overall Aim, Cond1, Profile, State, Services 1, Structure K(n)), if Overall Aim=Budget Follow Up & Restruct, if Cond1=(Fast, low Cost), if Profile=Standard, if State=Init, if Services 1=($C_{compta}$, $C_{Invest}$, $C_{eco-Pol}$), if Structure K(n)=$DM_{Fin}$,
→Send Goal1=Strat 1.1 (Overall Aim, Cond1, Profile, State, Services 1, $DM_{Fin}$) to COTS Data $IKM_{Fin}$
→If return COTS Data=Data 1, Data 1=(($DN_{compta}$, $DM_{Invest}$) extract from $DM_{Fin}$, and $DM_{Eco-Pol}$ extracts from DH), execute Structure K (n−1)=Data 1 and do end Strat 1.1 (Data 1)]

Rule of Strat 1.2
[If strat=Strat 1.2 (Overall Aim, Cond1, Profile, State, Structure K), if Overall Aim=Budget Follow Up & Restruct, if Cond1=(Fast, low Cost), if Structure K=($DM_{compta}$, $DM_{Invest}$, $DM_{Eco-Pol}$),
→Send Aim=Strat 1.2=Detection index by channel (Overall Aim, Cond1, Profile, State, $DM_{Compta}$) to $C_{Compta}$,
→Send Aim=Strat 1.2=Detection index by channel (Overall Aim, Cond1, Profile, State, $DM_{Eco-Pol}$) to $C_{eco-Pol}$]

$C_i$ for i=Compta and i=Eco-Pol

Aim Rule
[if Aim=Detection index by channel (Overall Aim, Cond 1, Profile, State, DMi), if Overall Aim=Budget Follow Up & Restruct, if Cond 1=(Fast, low Cost),
→Strat=Strat1 (Overall Aim, Cond1, Profile, DMi)]

Rule of Strat 1.0
[If strat=Strat 1.0 (Overall Aim, Cond1, Profile, State) applied to CMi, if Overall Aim=Budget Follow Up & Restruct, if Cond1=(Fast, low Cost), if Profile=Standard, if State=Init,
→To send Aim 1=Strat 1.0 (Overall Aim, Cond1, Profile, State) to COTS Service $IKM_{Fin}$
→If CMi=CMCompta, and if return COTS Services=Services 1, Services 1=($P_{Etats\ Fin}$, $P_{Cycle\ Inv}$, $P_{Cycle\ Fin}$), create Tracking agents=Services 1 and do end Strat 1.0 (Services 1)
→If CMi=$CM_{Eco-Pol}$, and if return COTS Services=Services 1, Services 1=($P_{Iraq}$, $P_{Asia}$), create Tracking agents=Services 1 and do end Strat 1.0 (Services 1)]

Rule of Strat 1.1
[If strat=Strat 1.1 (Overall Aim, Cond1, Profile, State, Services 1, Structure K(n)) applied to $CM_{Compta}$, if Overall Aim=Budget Follow Up & Restruct, if Cond1=(Fast, low Cost), if Services 1=($P_{Etats\ Fin}$, $P_{Cycle\ Inv}$, $P_{Cycle\ Fin}$), if Structure K(n)=$DM_{Compta}$,
→Send Aim 1=Strat 1.1 (Overall Aim, Cond1, Services 1, $DM_{Compta}$) to COTS Data $IK_{Fin}$
→If return COTS Data=Data 1, Data 1=($DM_{Etats\ Fin}$, $DM_{Cycle\ Inv}$, $DM_{Cycle\ Fin}$) extract from $DM_{Compta}$, execute K Structure (n−1)=Data 1 and do end Strat 1.1 (Data 1)]
[If strat=Strat 1.1 (Overall Aim, Cond1, Profile, State, Services 1, Structure K(n)) applied to $CM_{Eco-Pol}$, if Overall Aim=Budget Follow Up & Restruct, if Cond1=(Fast, low Cost), if Services 1=($P_{Iraq}$, $P_{Asia}$), if Structure K(n)=$DM_{Eco-Pol}$,
→Send Aim 1=Strat 1.1 (Overall Aim, Cond1, Services 1, $DM_{Eco-Pol}$) to COTS Data $IKM_{Fin}$
→If return COTS Data=Data 1, Data 1=($DM_{Iraq}$, $DM_{Asia}$) extract from $DM_{Ecol-Pol}$, execute K(n structure-1) Data 1, and do end Strat 1.1 (Data 1)]

Rule of Strat 1.2
[If strat=Strat 1.2 (Overall Aim, Cond1, Profile, State, Structure K) applied to $CM_{Compta}$, if Overall Aim=Budget Follow Up & Restruct, if Cond1 (Fast, low Cost), if Structure K=($DM_{Etats\ Fin}$, $DM_{Cycle\ Inv}$, $DM_{Cycle\ Fin}$),
→Send Aim=Strat 1.2=Detection index by track (Overall Aim, Cond 1, Profile, State, $DM_{Etats\ Fin}$) to $P_{Etas\ Fin}$]
[If strat=Strat 1.2 (Overall Aim, Cond1, Profile, State, Structure K) applied to $CM_{Eco-Pol}$, if Overall Aim=Budget Follow Up & Restruct, if Cond1=(Fast, low Cost), if Structure K=($DM_{Iraq}$, $DM_{Asia}$),
→Send Aim=Strat 1.2=Detection index by track (Overall Aim, Cond1, Profile, State, $DM_{Asia}$) to $P_{Asia}$]

APPENDIX II

Generic Aim and Strategy Rules of Invariant 2 of GM, UM, C,

Generic Aim Rule of GM
[If Aim=Overall Aim (d°1, Cond1, Profile CKM, Structure K, State) and if return of Detection Index=$O_i$ of $UM_i$, if return Op1 call ($O_i$)=yes, if return Op2 call=($O_i$)=no
⇒Strat—Strat 1+2 and Strat2 ($O_i$)]

Generic Strategy Rule of GM (Validation) (Strat 2)
[If strat=Strat 2 ($O_i$) (Overall Aim, Cond1, Profile, State, Structure K(n)), if Services Associated with Agent n=Services 1,
⇒Search Structure K(n−1) associated with Structure K(n) and Services 1
⇒Send Aim 1=Strat 2 ($O_i$, Overall Aim, Cond1, CKM Profile, State, Structure K(n−1) to $UM_i$ according to Cond1]

Generic Aim Rule of UM, C (Validation)
[If Aim=Local Aim 2 ($O_i$, Overall Aim, Cond1, CKM or IKM Profile, State, Structure K)
⇒Strat=Strat 2 ($O_i$, Overall Aim, Cond1, CKM or IKM Profile, State, Structure K)]
Remark: Agents below UM transmit IKM Profile. Only GMs and UMs receive CKM Profile.

Generic Strategy Rule UM, C(Structuring and Invariant 2) (Set of Strategies
[If strat=Strat 2 (Oi,) (Overall Aim, Cond1, Profile, State, Structure K(n)), if State=INIT
⇒Search if Agent (n−1) exist; if they do not exist:
⇒Execute Strat=Strat 1.0 (Overall Aim, Cond1, Profile, Agent) (Structuring Services) (see Structuring Rules of invariant 1)
⇒If Fine Strat 1.0=Services 1, execute Strat=Strat 1.1 (Aim Overall Cond1, Profile, Services 1 Structure K(n)) (Structuring Data)
⇒If Fine Strat 1.1=Data 1, execute Structure K(n−1)=Data 1, store in memory M Structure K(n−1) associated to Structure K(n) and to Services 1, and execute Strat=Strat 2.2 ($O_i$, Overall Aim, Cond1, Profile, State, Structure K(n)) (Invariant 2)
⇒If Agent (n−1) exist, to make Strat—Strat 2.2 (Invariant 2)]

Generic Strategy Rule of UM (Strat 2.2)
[If strat=Strat 2.2 ($O_i$, Overall Aim, Cond1, IKM Profile, State, Structure K(n)), if Agent (n−1)=Services 1,
⇒Search in M Structure K(n−1) associated with Structure K(n) and Services 1
⇒Send Aim=Strat 2.2 Validation−Channel ($O_i$, Overall Aim, Cond1, Profile, State, Structure K(n−1)) to CMi according to Cond1)

Generic Strategy Rule of C (Strat 2.2)

[If strat=Strat 2.2 ($O_i$, Overall Aim; Cond1, IKM Profile, State, Structure K(n)), if Agent (n−1)=Services 1, if Form (Oi) extracted of Structure K', ⇒Search Structure K' in Server of Structured Data M ⇒Search Structure K(n−1) associated with Structure K(n) and Services 1

⇒If Response Search=Structure K(n−1) and K', send Aim=Strat 2.2=Validation−Tracking ($O_i$, Overall Aim, Condo1, Profile, State, Structure K(n−1), K') to $PM_i$ according to Cond1 and Property ($O_i$)]

Remark: The validation strategy of the Master Channel depends on the operating conditions Cond1 and certain fields of $O_i$ specifically the origin of its form (which gives the domain to which the index belongs) and the Property field (which gives the type of knowledge obtained from the index).

The invention claimed is:

1. A method for making a decision when pursuing an overall aim, after discovery of an abnormality in an economic, technical, or organizational field, to counteract the abnormality, the method comprising:

associating with a collective knowledge manager a plurality of individual knowledge manager machines, each knowledge manager machine concerning a different point of view determined by the overall aim pursued;

establishing a structure of a first knowledge manager machine directly related to the field in which the abnormality has been detected and constituting a first decisional path, the structure of the first knowledge manager machine having a pyramidal shape, with a user manager at an apex, by associating user manager data processing agents located in a plurality of levels of the pyramidal shape, with, in the lowermost of the levels, portable knowledge object creating agents watching actual data in a specific field and detecting abnormalities in the actual data of the first knowledge manager machine, each abnormality detected in the actual data that is being watched, causing in response, creation of a portable knowledge object as an index object, and in the levels above the lowermost level including the knowledge object creating agents, knowledge object constructing agents adding additional knowledge elements to the portable knowledge objects created by the knowledge object creating agents;

transmitting the portable knowledge objects from the knowledge object constructing agents to the user manager and transmitting the portable knowledge object from the user manager to the collective knowledge manager;

selecting, in response to a request from the collective knowledge manager for further study of the portable knowledge objects constructed in the first knowledge manager machine, at least a second knowledge manger machine from the plurality of individual knowledge manager machines;

establishing a structure of the second knowledge manager machine, having a pyramidal shape, similar to the structure of the first individual knowledge manager machine, and constituting a second decisional path with a user manager at an apex, with knowledge object creating agents in a lowermost level of a plurality of levels in the pyramidal shape, and knowledge object constructing agents in levels above the knowledge object creating agents, to achieve the overall aim and results produced by the first individual knowledge manager machine; and providing, in the second knowledge manager machine, the knowledge object creating agents watching actual data and detecting, events related to the knowledge objects created in the first individual knowledge manager machine and, upon detection of an event, creating a knowledge object which is transmitted to the user manager of the second individual knowledge manager machine and to the collective knowledge manager and constructed by addition of additional object elements in the knowledge object constructing agents of the second individual knowledge manager machine to enable the collective knowledge manager to merge results of the first and second decisional paths of the first and second individual knowledge manager machines, to enable a decision for counteracting the abnormality detected.

2. The method as claimed in claim 1, including data processing agents organized into loops, with a data processing agent in one level of a pyramid of a master agent, and at least one child agent in a level below the master agent so that a strategy followed by the master agent is an aim of the child agent, wherein the child agent is the master agent of at least one child agent in a level directly below the master agent.

3. A method for making a decision when pursuing an overall aim, after discovery of an abnormality in an economic, technical, or organizational field, to counteract the abnormality, the method comprising:

associating with a collective knowledge manager a plurality of individual knowledge manager machines, each knowledge manager machine concerning a different point of view determined by the overall aim pursued;

establishing a structure of a first knowledge manager machine directly related to the field and constituting a first decisional path, the structure of the first knowledge manager machine having a pyramidal shape, with a user manager at an apex, by associating user manager data processing agents located in a plurality of levels of the pyramidal shape, with, in the lowermost of the levels, portable knowledge object creating agents watching actual data in a specific field and detecting abnormalities in the actual data, each abnormality causing creation of a portable knowledge object as an index object, and in the levels above the lowermost level including the knowledge object creating agents, knowledge object constructing agents adding additional knowledge elements to the portable knowledge objects created by the knowledge object creating agents;

transmitting the portable knowledge objects from the knowledge object constructing agents to the user manager and transmitting the portable knowledge object from the user manager to the collective knowledge manager;

establishing a structure of a second of the individual knowledge manager machines, having a pyramidal shape, similar to the structure of the first individual knowledge manager machine, and constituting a second decisional path with a user manager at an apex, with knowledge object creating agents in a lower most level of a plurality of levels in the pyramidal shape, and knowledge object constructing agents in levels above the knowledge object creating agents, to achieve the overall aim and results produced by the first individual knowledge manager machine;

providing, in the second individual knowledge manager machine, the knowledge object creating agents watching actual data and detecting, events related to the knowledge objects created in the first individual knowledge manager machine and, upon detection of an event, creating a knowledge object which is transmitted to the user manager of the second individual knowledge manager machine and to the collective knowledge manager and constructed by addition of additional object elements in the knowledge object constructing agents of the second individual knowledge manager machine to enable the collective knowledge manager to merge results of the first and second decisional paths of the first and second individual knowledge manager machines, to enable a decision for counteracting the abnormality detected;

organizing data processing agents into loops, with a data processing agent in one level of a pyramid of a master agent;

locating at least one child agent in a level below the master agent so that a strategy followed by the master agent is an aim of the child agent, wherein the child agent is the master agent of at least one child agent in a level directly below the master agent; and establishing a loop of the pyramid with a structuring agent comprising a service structuring agent and a data structuring agent, wherein the master agent of the loop obtains, from the service structuring agent, services considered in the service structuring agent to be necessary to accomplish the overall aim, and the strategy of the loop master agent, to create, for each service, a child agent, and to obtain from the data structuring agent, the data necessary for each child agent to implement an aim of the child agent.

4. The method as claimed in claim 3, wherein each knowledge object constructing agent is provided with aim and strategy rules.

5. The method as claimed in claim 4, wherein a knowledge object creating agent comprises aim and plan rules enabling the knowledge object creating agent to observe data concerning the field and to capture data representing an abnormality in the data concerning the field.

6. The method as claimed in claim 5, including a knowledge object created and provided with additional knowledge object elements, comprising a predetermined number of elements, each element concerning a knowledge aspect, indicating nature, context[H] and importance of the knowledge object.

7. The method as claimed in claim 6, wherein the user manager at the apex of the individual knowledge manager machines receives the knowledge object created, and including additional knowledge object elements to structure the knowledge objects and to transmit to the collective knowledge manager at least the knowledge object which has been created, as an index object, in the first individual knowledge manager machine of the field.

8. The method as claimed in claim 7, wherein the collective knowledge manager updates the knowledge object received by merging knowledge object versions of the knowledge object, received from each individual knowledge manager machine, to present to an operator the knowledge object in a newly structured configuration.

9. The method as claimed in claim 8, including producing a dialogue between the operator and the collective knowledge manager according to pre-established rules governing operation of the collective knowledge manager.

10. The method as claimed in claim 9, including displaying, by the collective knowledge manager, on an interface screen, configuration of the structured knowledge object.

11. The method as claimed in claim 9, including gathering, by the operator, more information on aspects of the knowledge object through the dialogue between the operator and the collective knowledge manager, according to predetermined rules, to implement a supplementary decision stage in which the collective knowledge manager sends a request to the individual knowledge manager machine that is most involved, thereby giving the information desired by the operator.

12. The method as claimed in claim 11, including, executing by the individual knowledge manager machine, a mission in response to a request by cooperating with at least one other individual knowledge manager machine according to predetermined rules.

13. The method as claimed in claim 12, wherein the individual knowledge manager machine which has received the request from the collective knowledge manager in the individual manager machine makes an investigation within the individual knowledge manager machine of the individual knowledge manager machine, in response to the request, in accordance with specific aim and strategy rules.

14. The method as claimed in claim 13, comprising a further supplementary decision stage, including a technical analysis of the knowledge object, completed by information items resulting from foregoing decision stages, enabling a decision to be made by the individual knowledge manager machine in accordance with specific aim and strategy rules.

15. The method as claimed in claim 8, wherein information items given by a knowledge object are represented in a structured knowledge tree, organized in knowledge classes, each knowledge object being detected as an index corresponding to a structured knowledge tree.

* * * * *